US008705122B2

(12) United States Patent
Matsuzaki

(10) Patent No.: US 8,705,122 B2
(45) Date of Patent: Apr. 22, 2014

(54) IMAGE PROCESSING APPARATUS, IMAGE PROCESSING METHOD, AND PROGRAM FOR EXECUTING THE IMAGE PROCESSING METHOD

(75) Inventor: Masanori Matsuzaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 13/117,059

(22) Filed: May 26, 2011

(65) Prior Publication Data

US 2011/0299102 A1  Dec. 8, 2011

(30) Foreign Application Priority Data

Jun. 3, 2010  (JP) .................................. 2010-127538

(51) Int. Cl.
*G06F 15/00* (2006.01)
*G06K 1/00* (2006.01)
*H04N 1/60* (2006.01)

(52) U.S. Cl.
USPC .......................................... 358/1.9; 358/518

(58) Field of Classification Search
USPC .................................. 358/1.9, 518
See application file for complete search history.

(56) References Cited

U.S. PATENT DOCUMENTS

| 7,764,411 | B2 | 7/2010 | Kishimoto |
| 8,045,186 | B2 | 10/2011 | Sakurai |
| 8,325,396 | B2 | 12/2012 | Kishimoto |
| 2006/0139668 | A1* | 6/2006 | Nishikawa ..................... 358/1.9 |
| 2008/0239344 | A1* | 10/2008 | Wang et al. .................... 358/1.9 |
| 2009/0147326 | A1 | 6/2009 | Matsuzaki ..................... 358/518 |
| 2010/0053653 | A1 | 3/2010 | Hatori et al. |

FOREIGN PATENT DOCUMENTS

| CN | 101022501 A | 8/2007 |
| CN | 101184149 A | 5/2008 |
| CN | 101582977 A | 11/2009 |
| CN | 101662571 A | 3/2010 |
| JP | 2006-165864 | 6/2006 |

OTHER PUBLICATIONS

Chinese Office Action dated Aug. 14, 2013 in corresponding Chinese Appl. No. 201110150858.2.

* cited by examiner

*Primary Examiner* — Mark Zimmerman
*Assistant Examiner* — Michael Burleson
(74) *Attorney, Agent, or Firm* — Fitzpatrick, Cella, Harper & Scinto

(57) ABSTRACT

An image processing apparatus allows a printer to output chart data of a plurality of kinds of color mixture expressed by a three-dimensional color space constructed by CMY; obtains colorimetry values obtained from the output chart data; forms a reference value by converting patch data of the color mixture expressed by the three-dimensional color space into a device independent color space on the basis of a first color conversion table for converting the three-dimensional color space into the device independent color space; corrects a second color conversion table by using the obtained colorimetry values, the formed reference value, and the second color conversion table for converting the device independent color space into the three-dimensional color space; and forms a color conversion table for correcting a four-dimensional color space constructed by CMYK by using the first color conversion table and the second color conversion table.

19 Claims, 18 Drawing Sheets

IMAGE PROCESSING APPARATUS, IMAGE PROCESSING METHOD, AND PROGRAM FOR EXECUTING THE IMAGE PROCESSING METHOD

BACKGROUND OF THE INVENTION

1. Field of the Invention

The present invention relates to an image processing apparatus and an image processing method for correcting a color shade of a color mixture and a storage medium in which an image processing program has been stored.

2. Description of the Related Art

In recent years, performance of an electrophotographic apparatus has been improved and an apparatus which can realize picture quality similar to that of a printer has been put into practical use. However, such a problem that a fluctuation amount of color is larger than that of the printer because of instability that is peculiar to the electrophotography still remains. To solve such a problem, a calibration technique for forming an LUT (Look Up Table) for one-dimensional tone correction corresponding to each toner of cyan, magenta, yellow, and black has been installed in the electrophotographic apparatus in the related art. The LUT is a table showing output data corresponding to input data partitioned by a specific interval and can express non-linear characteristics which cannot be expressed by an arithmetic operational expression. According to the LUT for 1-dimensional tone correction, each input signal value of cyan, magenta, yellow, and black is converted into an output signal value which can be expressed on the printer side and an image is formed onto paper by using toner of an amount corresponding to the output signal value. As a method of forming the LUT for 1-dimensional tone correction, first, a chart constructed by data of a different tone corresponding to each toner of cyan, magenta, yellow, and black is prepared and output by the printer. Subsequently, a value is read out from the chart output by the printer by using a scanner, a colorimetry apparatus, or the like. By comparing the read value with target data which has previously been stored, the 1-dimensional LUT for correction is formed.

However, even if the tone characteristics of a monochrome are combined by the 1-dimensional LUT, it is difficult to guarantee a color reproduction of the color mixture in which the cyan, magenta, and yellow toner of red, green, blue, black, and the like have been mixed. Therefore, such a technique that an attention is paid to a destination profile among ICC (International Color Consortium) profiles and the color reproduction of the color mixture is corrected by modifying the destination profile has been proposed (for example, the Official Gazette of Japanese Patent Application Laid-Open No. 2006-165864).

First, the chart formed by the color mixture is output by the printer and the output chart is measured by the scanner or colorimetry apparatus. A difference is formed by using a colorimetry result and a target value, a 3-dimensional LUT (destination profile) for converting a device independent color space (L*a*b*) which the ICC profiles have into a device dependent color space (CMYK) is updated in accordance with the formed difference, and a color shade of the color mixture can be corrected. L*a*b* is one of the color spaces which do not depend on the device, L* denotes a luminance, and a*b* denotes a hue and a saturation.

However, according to the technique for correcting the color mixture in the related art, since a process for correcting the destination profile among the ICC profiles is executed, there is such a problem that when the user uses a plurality of destination profiles, the correcting process has to be executed to all of the profiles. In addition, the color shade of the color mixture cannot be corrected to an LUT which does not use the device independent color space such as a device link profile or the like or to a process which does not use a profile such as a copy or the like instead of using the destination profile.

Further, although a method of correcting by using a multi-dimensional LUT in order to correct the color shade of the color mixture is considered, when it is intended to correct the multi-dimensional LUT, such a problem that the number of data for correction increases occurs. For example, in the case of forming correction data by using the chart of level 32 of each color of CMYK by using the 1-dimensional LUT, 128 (=32 levels×4 colors) data are necessary. Likewise, in the case where the same method as that of the 1-dimensional LUT is used to a 4-dimensional LUT, 1048576 (=32 levels (cyan)×32 levels (magenta)×32 levels (yellow)×32 levels (black)) are necessary in order to obtain a similar precision. There is, consequently, such a problem that an amount of data of the charts to form the correction data becomes very large.

SUMMARY OF THE INVENTION

In order to solve the programs discussed above, the present invention provides a image processing apparatus comprising: an output control unit configured to allow a printer to output chart data of a plurality of kinds of color mixture expressed by a three-dimensional color space constructed by cyan, magenta, and yellow (CMY); an obtaining unit configured to obtain colorimetry values obtained from the output chart data; a value forming unit configured to form a reference value by converting patch data of the color mixture expressed by the three-dimensional color space into a device independent color space on the basis of a first color conversion table for converting the three-dimensional color space into the device independent color space; a correction unit configured to correct a second color conversion table by using the obtained colorimetry values, the formed reference value, and the second color conversion table for converting the device independent color space into the three-dimensional color space; and a table forming unit configured to form a color conversion table for correcting a four-dimensional color space constructed by cyan, magenta, yellow, and black (CMYK) by using the first color conversion table and the second color conversion table.

Further features of the present invention will become apparent from the following description of exemplary embodiments with reference to the attached drawings.

DESCRIPTION OF THE EMBODIMENTS

An embodiment of the invention will be described hereinbelow with reference to the drawings. A description will be made on the assumption that a 3-dimensional color space is constructed by cyan, magenta, and yellow (CMY) and a 4-dimensional color space is constructed by cyan, magenta, yellow, and black (CMYK).

Embodiment 1

In the embodiment, a method of calculating a 4-dimensional LUT for correcting a color shade of a color mixture of a device will be described.

Figure 1:
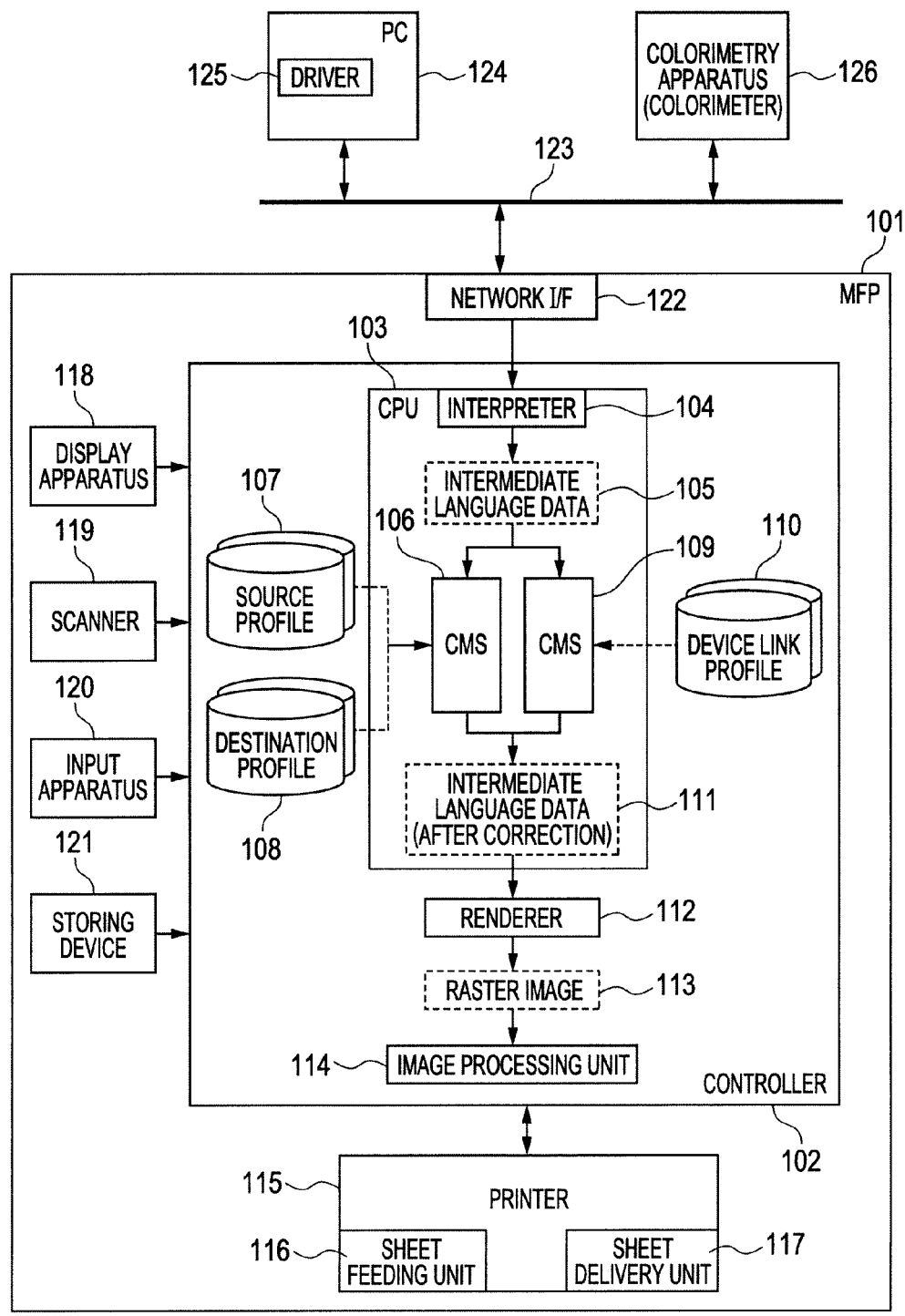
FIG. 1 is a constructional diagram of a system.

FIG. 1 is a constructional diagram of a system in the embodiment of the invention. A first MFP (Multifunction Peripheral) 101 for forming a print image onto paper by using each toner of cyan, magenta, yellow, and black is connected to a network 123. A computer (PC) 124 is connected to the first MFP 101 through the network 123. A driver 125 in the PC 124 transmits print data to the first MFP 101. A colorimetry apparatus 126 is an apparatus which can read a chart and obtain values of a color space such as L*a*b*, XYZ, or the like which does not depend on a device. The colorimetry apparatus 126 can transmit data to the PC 124 and the MFP 101 through the network 123.

The MFP 101 will be described in detail. A network I/F 122 receives the print data or the like and transmits raster image, control data, and the like, which will be described hereinafter. A controller 102 is constructed by a CPU 103, a renderer 112, and an image processing unit 114. An interpreter 104 of the CPU 103 interprets a PDL portion of the received print data and forms intermediate language data 105. A CMS (Color Management System) 106 performs a color conversion by using a source profile 107 and a destination profile 108 and forms intermediate language data (after the CMS) 111. The CMS is an abbreviation of Color Management System and performs a color conversion by using information of a profile, which will be described hereinafter. The source profile 107 is a profile for converting a color space such as RGB, CMYK, or the like which depends on a device into a color space such as L*a*b*, XYZ, or the like of a color space which does not depend on a device. XYZ is also a device independent color space similar to L*a*b* and expresses a color by three kinds of stimulus values. The destination profile 108 is a profile for converting a device independent color space into a CMYK color space which depends on a device (printer 115). In a CMS 109, a color conversion is performed by using a device link profile 110, thereby forming the intermediate language data (after the CMS) 111. The device link profile 110 is a profile for directly converting a device dependent color space such as RGB, CMYK, or the like into the CMYK color space which depends on the device (printer 115). Which one of the CMSs is selected depends on settings in the driver 125. Although the CMSs are separated in accordance with a type of profile in the embodiment, a plurality of kinds of profiles may be handled by one CMS. The type of profile is not limited to the example mentioned above but an arbitrary type of profile may be used so long as it uses the device dependent CMYK color space of the printer 115.

The renderer 112 forms a raster image 113 from the formed intermediate language data (after the CMS) 111. The image processing unit 114 executes an image process to the raster image 113 and an image read by a scanner 119. The printer 115 connected to the controller 102 forms output data onto paper by using color toner of cyan, magenta, yellow, black, and the like. The printer 115 has a sheet feeding unit 116 for feeding the paper and a sheet delivery unit 117 for delivering the paper on which the output data has been formed. A display apparatus 118 displays a UI showing instructions to the user and a state of the MFP 101. The scanner 119 includes an automatic document feeder. The scanner 119 irradiates a bundle of original images or one sheet of original image by a light source (not shown), forms the image reflected from the original onto a solid state image pickup device such as a CCD sensor or the like, and obtains a raster-shaped image read signal as image data from the solid state image pickup device. An input apparatus 120 is an interface for receiving an input from the user. A storing device 121 stores the data processed by the controller 102, the data received by the controller 102, and the like.

Figure 2:
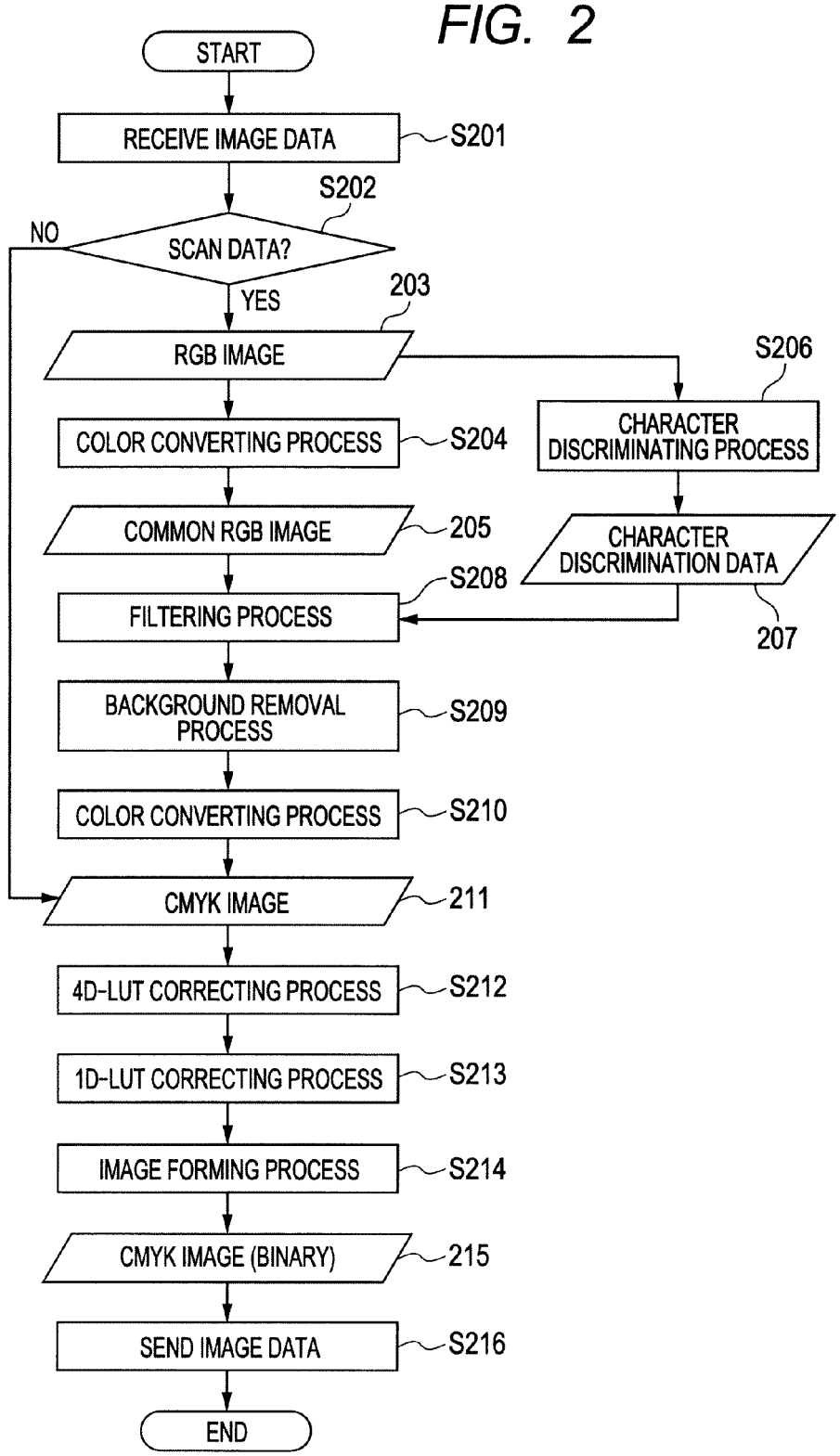
FIG. 2 is a flowchart illustrating a flow of an image process.

Subsequently, a flow for processes of the image processing unit 114 will be described with reference to FIG. 2.

In step S201, the image processing unit 114 receives the image data. In step S202, the image processing unit 114 discriminates whether or not the received image data is scan data received from the scanner 119 or the raster image 113 sent from the driver 125. If it is not the scan data, the image data is the raster image 113 and becomes a CMYK image 211 converted by the CMS into CMYK which depends on the printer device. If it is the scan data, since the image data is an RGB image 203, in step S204, the image processing unit 114 executes a color converting process and forms a common RGB image 205. The common RGB image 205 is defined by an RGB color space which does not depend on the device and can be converted into a device independent color space such as L*a*b* or the like by the arithmetic operation. In step S206, the image processing unit 114 executes a character discriminating process and forms character discrimination data 207. In this instance, an edge or the like of the image is detected and the character discrimination data 207 is formed. In step S208, the image processing unit 114 executes a filtering process to the common RGB image 205. In this instance, a different filtering process is executed to a character portion and to other portions by using the character discrimination data 207. Subsequently, in step S209, the image processing unit 114 executes a background removal process. In step S210, the unit 114 executes a color converting process and forms the CMYK image 211 in which a background has been removed.

Subsequently, in step S212, the image processing unit 114 executes a correcting process using the 4-dimensional LUT. In the embodiment, a color shade of the color mixture is corrected by using the 4-dimensional LUT. A forming method of the 4-dimensional LUT adapted to correct the color shade of the color mixture will be described hereinafter. After the color shade of the color mixture was corrected, in step S213, the image processing unit 114 corrects tone characteristics of each monochrome of cyan, magenta, yellow, and black by using a 1-dimensional LUT. Since an existing method is used as a forming method of the 1-dimensional LUT, its description is omitted here. At last, the image processing unit 114 executes an image forming process (halftone process such as dither, error diffusion process, or the like) and forms a CMYK image (binary) 215 in step S214 and transmits the image data to the printer 115 in step S216.

Figure 3:
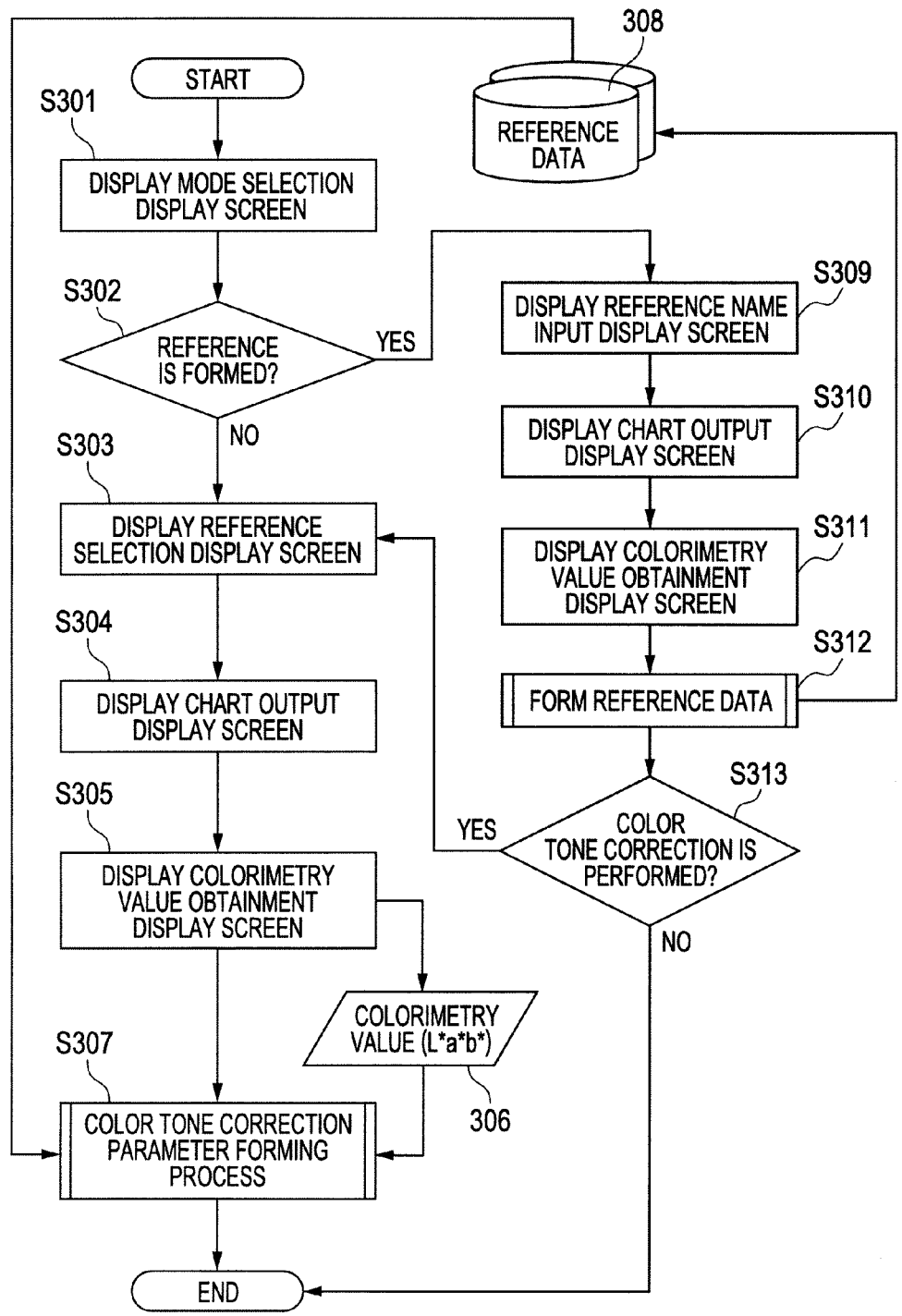
FIG. 3 is a flowchart illustrating a flow of a UI for promoting the user to instruct to form a 4-dimensional LUT.

Subsequently, a flow for processes of a UI for receiving an instruction from the user in order to form the 4D-LUT adapted to correct the color shade of the color mixture will be described with reference to FIG. 3.

Figure 15:
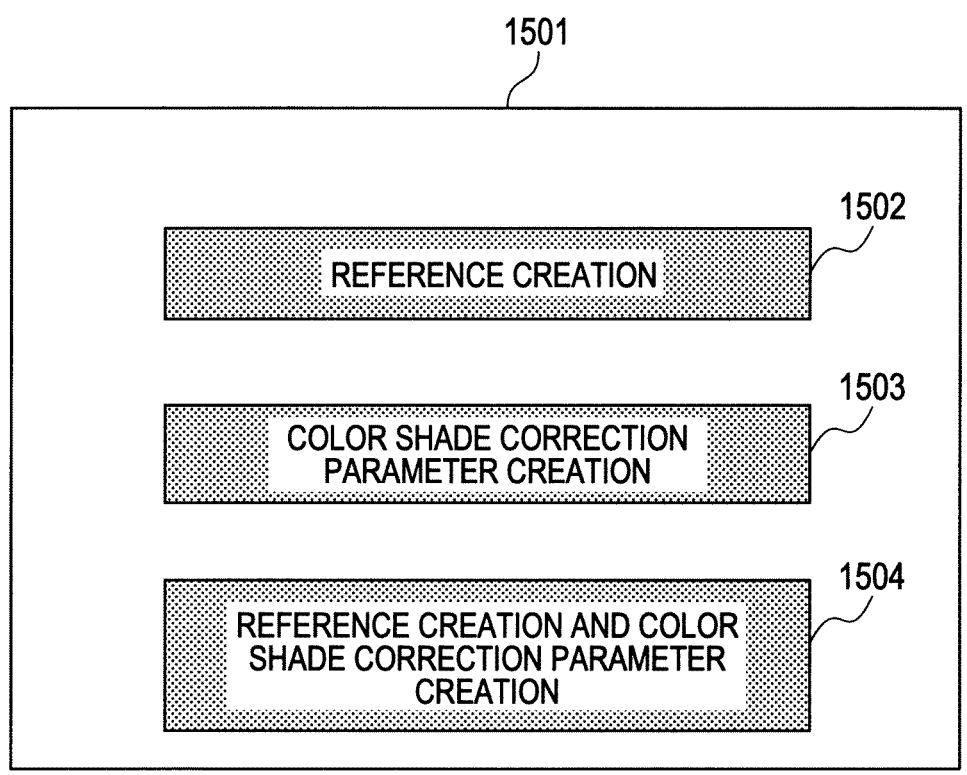
FIG. 15 is a diagram illustrating an example of a mode selection display screen when the 4-dimensional LUT is formed.

First, in step S301, the display apparatus 118 displays a mode selection display screen. An example of the mode selection display screen is illustrated in FIG. 15. A reference creation processing button 1502, a color shade correction parameter creation button 1503, and a reference creation and color shade correction parameter creation button 1504 are displayed in a UI 1501. The user presses a proper one of those buttons, so that an instruction can be received.

When the color shade correction parameter creation button 1503 is pressed, it is determined that the reference is not formed. In step S303, the display apparatus 118 displays a reference selection display screen. When the reference creation processing button 1502 or the reference creation and color shade correction parameter creation button 1504 is pressed, it is determined that the reference is formed in step S302, and a reference forming process is executed.

In the reference forming process, first, in step S309, the display apparatus 118 displays a reference name input display screen. In this instance, an input of a reference name from the user is received. In step S310, the display apparatus 118 displays an output instruction display screen of a chart necessary to form reference data 308. When the user instructs an output of the chart, the printer 115 outputs the chart. Subsequently, the display apparatus 118 displays a colorimetry value obtainment display screen in step S311. When the user sets the chart into the scanner 119 and the colorimetry apparatus 126, the colorimetry values of the chart are obtained by using the scanner 119 and the colorimetry apparatus 126. In step S312, the controller 102 forms the reference data 308 from the obtained colorimetry values.

The reference data 308 is constructed by an LUT 407 of CMY→L*a*b* (FIG. 4), an LUT 510 of L*a*b*→CMY (FIG. 5), and chart data C (CMY) 706 (FIG. 7) and show characteristics of the color shade including the color mixture of the printer 115 at a point of time when the user has executed the process. Details of a process to form the reference data will be described hereinafter.

Subsequently, whether or not a color shade correction is made is discriminated in step S313. When the reference creation processing button 1502 is pressed on the mode selection display screen, the controller 102 determines that color shade correction is not made, and the process is finished. When the reference creation and color shade correction parameter creation button 1504 is pressed, the controller 102 determines that color shade correction is made, and the processing routine advances to step S303. The display apparatus 118 displays the reference selection display screen.

Figure 16:
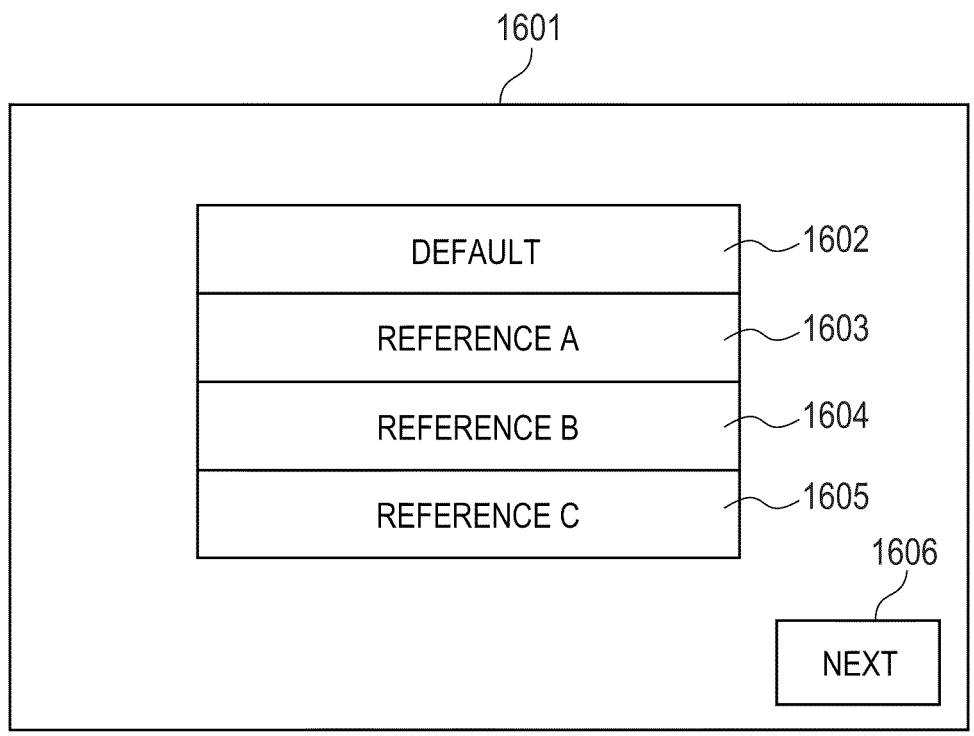
FIG. 16 is a diagram illustrating an example of a display screen for selecting a reference value.

The reference selection display screen will be described with reference to FIG. 16. The display apparatus 118 displays candidates of the reference in a list form into a UI 1601. Display names of the list correspond to the reference data 308. In FIG. 16, a default 1602, a reference A 1603, a reference B 1604, and a reference C 1605 are displayed as a list. The default is the reference data 308 as preset and the others become the reference data 308 as formed by an instruction of the user. Timing when the user issues the instruction is timing when the user considers that a similar color reproduction will be necessary in future when executing reprinting later such as (1) timing when the MFP 101 is purchased (installed), (2) timing before important electronic data which needs to be reprinted is printed by the MFP 101, or the like. When a "next" button 1606 is pressed after completion of the selection on the list, the reference data is selected and the next display screen is displayed. The number of references on the list increases by executing the reference data forming process based on the instruction of the user. Generally, the default is the reference data of a representative apparatus of the MFP 101 which is provided by the manufacturing maker of the MFP 101. By selecting the reference data, the color shade can be corrected so as to match with a state of the representative apparatus. By selecting the reference formed by the instruction of the user, the color shade can be corrected so as to match with the color shade at the point of time when the reference has been formed.

In step S304, the display apparatus 118 displays a chart output instruction display screen. When an instruction is made by the user, a chart different from that in step S310 is output from the printer 115. In step S305, the colorimetry value obtainment display screen is displayed. When the user sets the chart into the scanner 119 and the colorimetry apparatus 126, colorimetry values 306 of the chart are obtained by using the scanner 119 and the colorimetry apparatus 126. In step S307, the controller 102 performs the color shade correction parameter creation by using the obtained colorimetry values 306 and the reference data 308. Details of the color shade correction parameter creation will be described hereinafter.

Subsequently, a flow for the reference data forming process which is executed in steps S310 to S312 will be described with reference to FIGS. 4 to 7.

Figure 4:
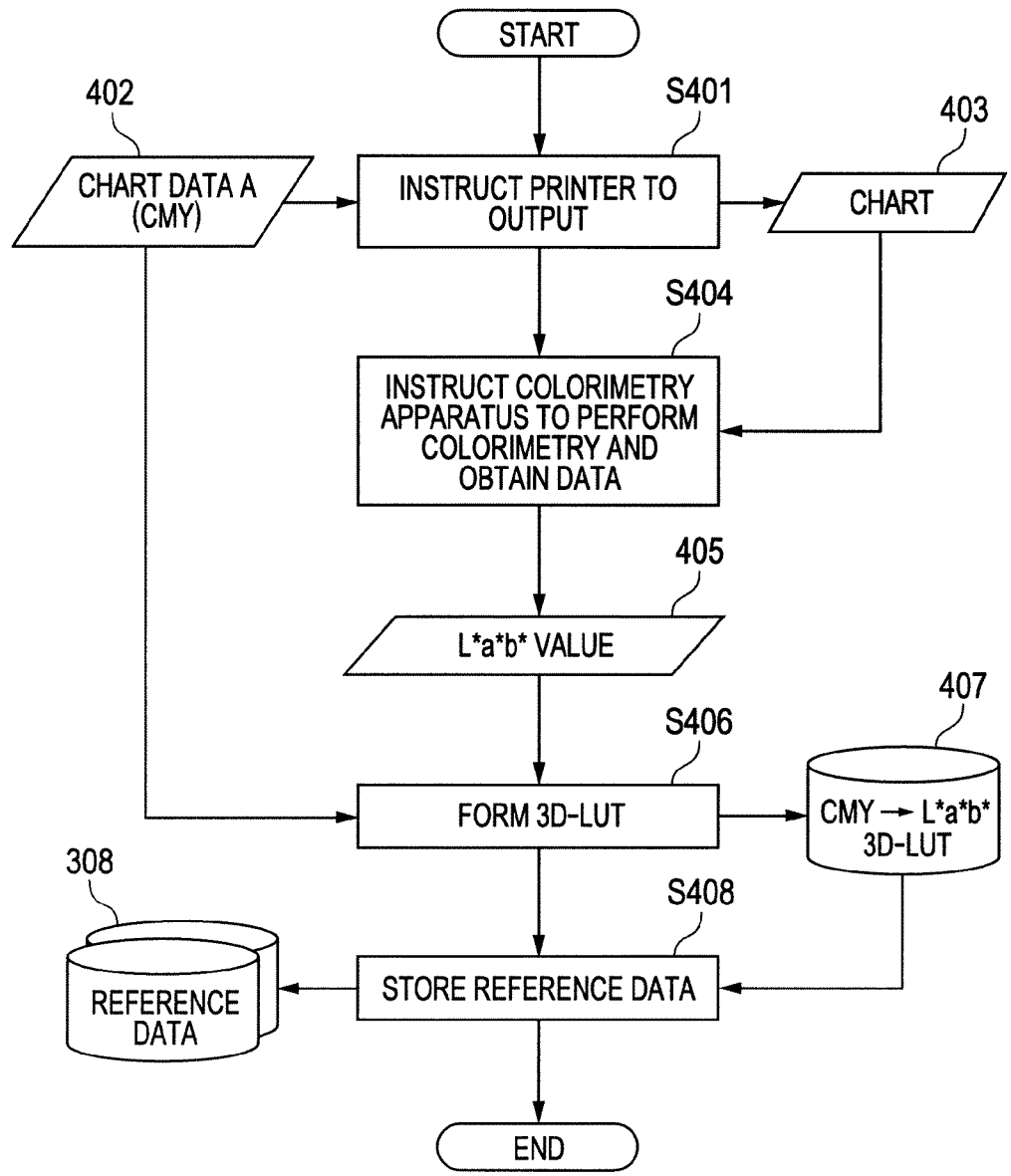
FIG. 4 is a flowchart illustrating a flow of a process to form an LUT for converting CMY as one of reference data into L*a*b*.

FIG. 4 illustrates a flow of a process to form the LUT 407 (first color conversion table) for converting CMY as one of the reference data into L*a*b*.

Figure 17:
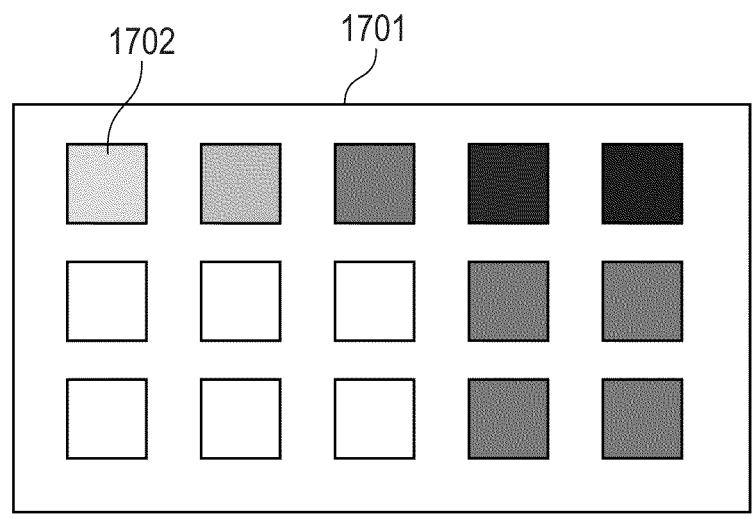
FIG. 17 is a diagram illustrating an example of the chart data.

First, in step S401, the controller 102 reads out chart data A (CMY) 402, executes a process in the image processing unit 114, transmits the processed data to the printer 115, and outputs a chart 403. The chart data A (CMY) 402 is data in which the CMY has been increased at an equivalent interval. For example, each of C, M, and Y is divided into 1/8, the chart data A (CMY) 402 is constructed by 512 (=8×8×8) data. An example of the chart is illustrated in FIG. 17. The data is expressed as rectangle data 1702 having a predetermined size per data on a sheet 1701. Such rectangle data is defined as patch data or a patch in the embodiment. Although an example of 15 patches is illustrated in FIG. 17, if the patch is constructed by 512 data, there are 512 patch data 1702.

Subsequently, in step S404, the controller 102 performs the colorimetry of the chart 403 by using the colorimetry apparatus 126 and obtains L*a*b* values 405. In step S406, the 3D-LUT 407 of CMY→L*a*b* is formed by using the chart data A (CMY) 402 and the colorimetry L*a*b* values 405. In step S408, the 3D-LUT 407 of CMY→L*a*b* is stored into the reference data 308. The 3D-LUT denotes an LUT in which the input side is 3-dimensional.

Figure 5:
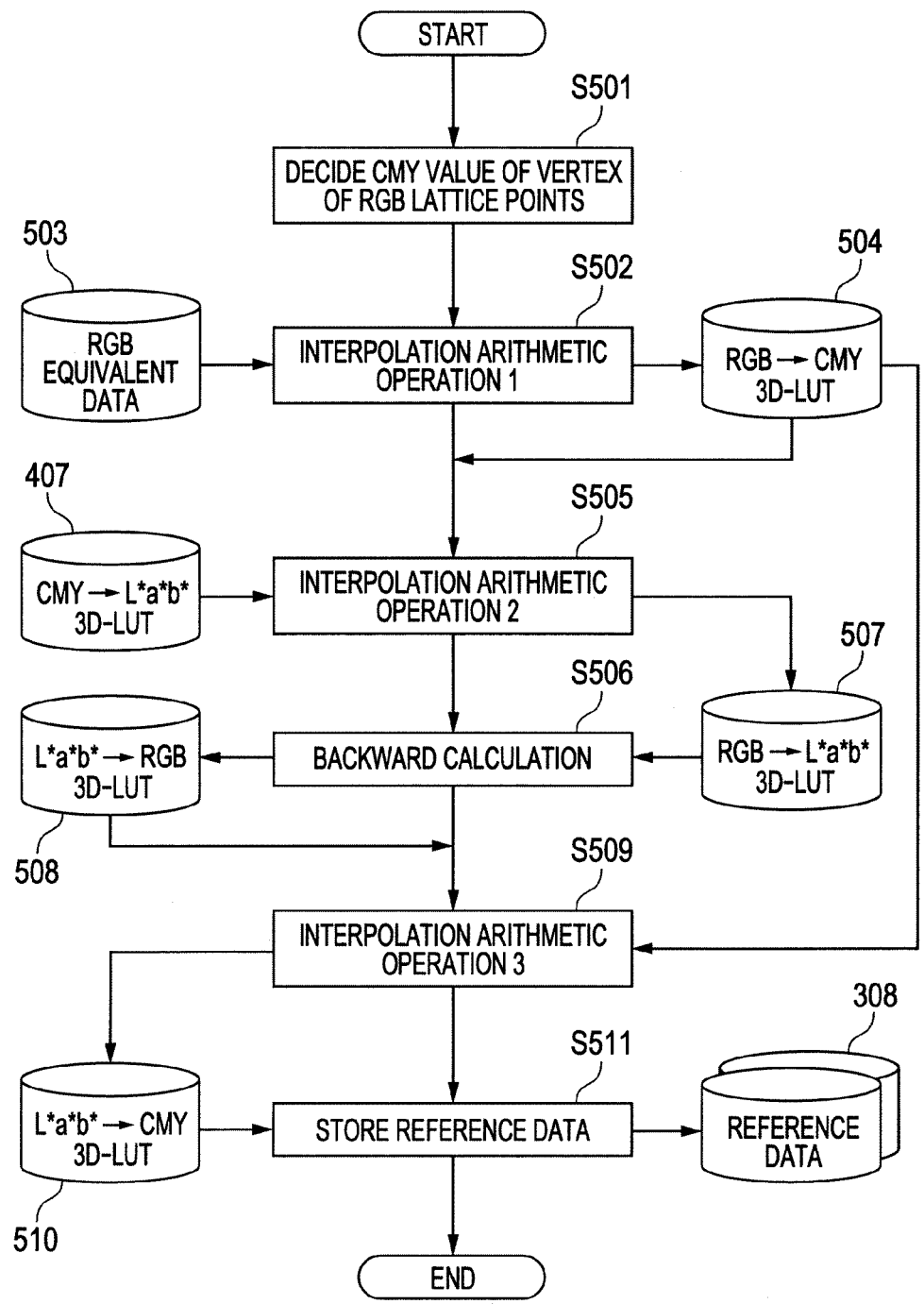
FIG. 5 is a flowchart illustrating a flow of a process to form an LUT for converting L*a*b* as one of the reference data into CMY.

FIG. 5 illustrates a flow of a process to form the LUT 510 for converting L*a*b* as one of the reference data into CMY.

Figure 6:
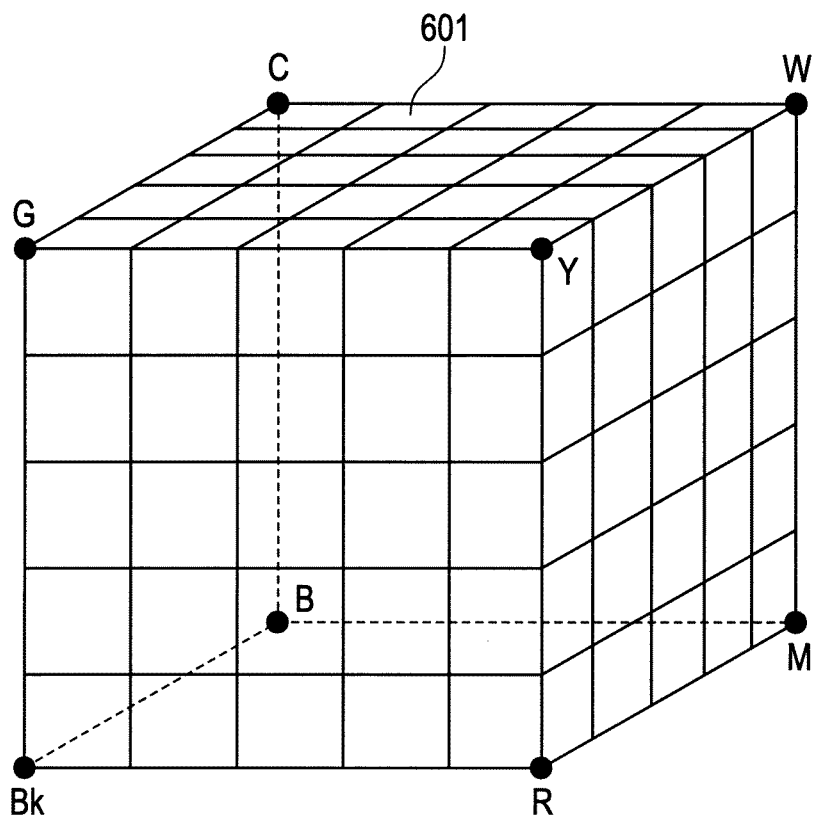
FIG. 6 is a diagram illustrating lattice points of an RGB color space.

First, in step S501, the controller 102 decides CMY values corresponding to vertices of lattice points of the RGB color space. In FIG. 6, a lattice point 601 of the RGB color space is illustrated. The data is equivalently divided every color of RGB and corresponds to the input side, that is, the RGB side of a 3D-LUT of RGB→CMY, which will be described hereinafter. Although vertices of R, G, B, C, M, Y, Bk, and W exist in the RGB color space 601, the CMY values corresponding to the vertices are determined in step S501. For example, when each of CMY is expressed by 8 bits, the CMY values corresponding to the vertex of R are equal to (C, M, Y)=(0, 255, 255). Since the corresponding CMY values depend on characteristics (amount of toner application or the like, which will be described hereinafter) of the printer 115, they are not always the same value irrespective of the printer. However, in the case of RGBCMY, a combination in which the highest saturation is obtained is selected. In the case of Bk, a combination in which the lowest brightness is obtained is selected. An arbitrary combination of the CMY values may be used here.

Subsequently, in step S502, the controller 102 forms an LUT 504 of RGB→CMY by using the existing interpolation arithmetic operating method by using RGB equivalent data 503 obtained by dividing the RGB color space 601 at a predetermined interval and the CMY values of the vertices of the RGB color space. Subsequently, in step S505, the controller 102 executes the existing interpolation arithmetic operation by using the 3D-LUT 407 of CMY→L*a*b* to the output values, that is, the CMY values of the 3D-LUT 504 of RGB→CMY and calculates a 3D-LUT 507 of RGB→L*a*b*. The 3D-LUT 407 of CMY→L*a*b* is an LUT calculated in the processes in FIG. 4. Subsequently, in step S506, the controller 102 executes a backward calculation by using an existing arithmetic operating method from the 3D-LUT 507 of RGB→L*a*b* and forms a 3D-LUT 508 of L*a*b*→RGB. In step S509, the controller 102 executes an interpolation arithmetic operation by using the 3D-LUT 504 of RGB→CMY to the output values, that is, the RGB values of the 3D-LUT 508 of L*a*b*→RGB, thereby forming the 3D-LUT 510 of L*a*b*→CMY (second color conversion table). Finally, in step S511, the controller 102 stores the 3D-LUT 510 of L*a*b*→CMY as reference data 308.

Figure 7:
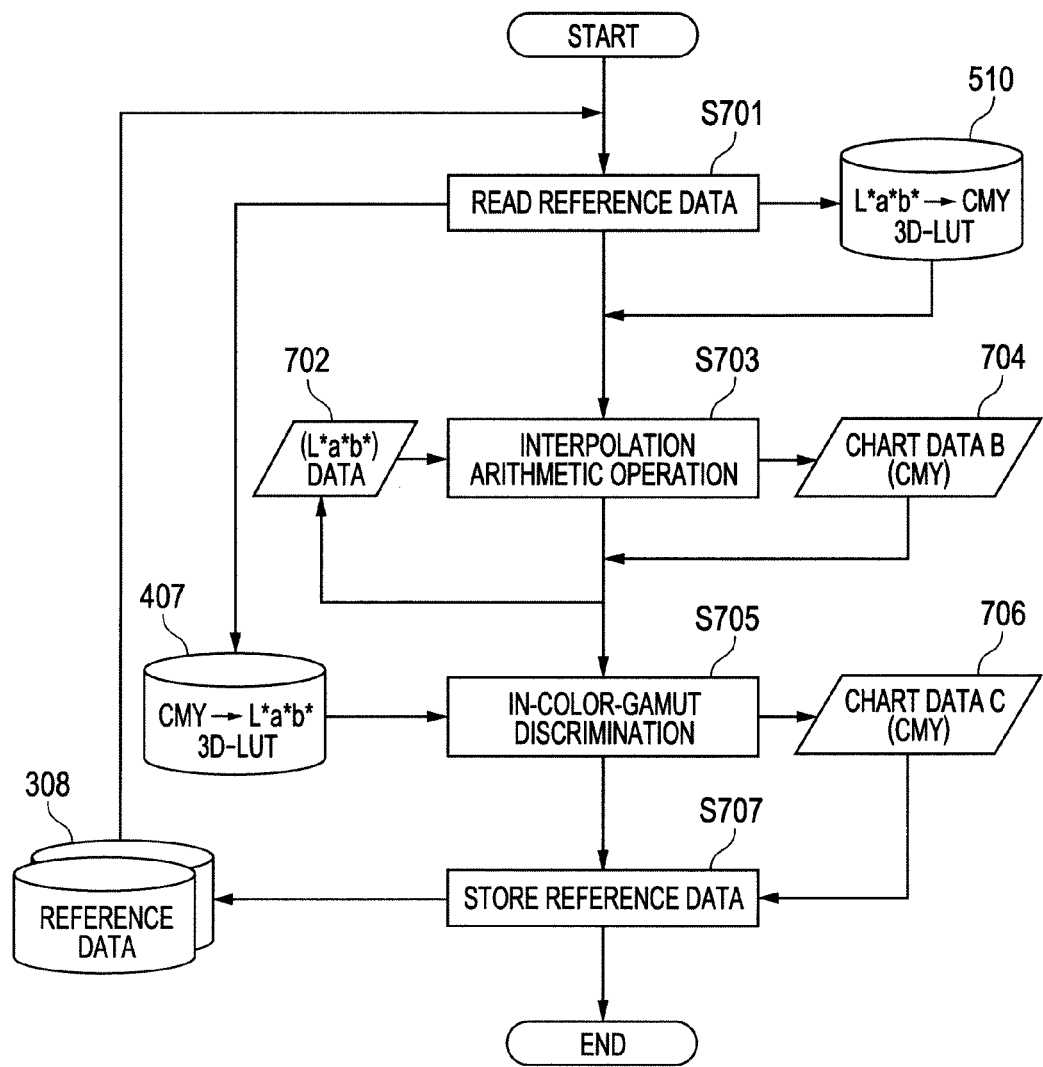
FIG. 7 is a flowchart illustrating a flow of a process to form chart data as one of the reference data.

FIG. 7 illustrates a flow of a process to form the chart data C (CMY) 706 as one of the reference data 308.

First, in step S701, the controller 102 reads out the 3D-LUT 407 of CMY→L*a*b* and the 3D-LUT 510 of L*a*b*→CMY from the reference data 308. Subsequently, in step S703, the controller 102 executes an interpolation arithmetic operation by using L*a*b* data 702 and the 3D-LUT 510 of L*a*b*→CMY and forms a chart data B (CMY) 704. In this instance, the L*a*b* data 702 is data defined by an arbitrary number of a large number of combinations of L*a*b*. For example, equivalent data in which the L*a*b* color space is divided by a predetermined interval can be mentioned.

Subsequently, in step S705, the controller 102 executes an in-color-gamut discrimination by using the 3D-LUT 407 of CMY→L*a*b*, the chart data B (CMY) 704, and the L*a*b* data 702. The color gamut denotes a color-reproducible color region of the printer 115 when the 3D-LUT 407 of the reference data is formed. An example of the in-color-gamut discrimination will be described hereinbelow. The L*a*b* values are calculated by executing an interpolation arithmetic operation by using the 3D-LUT 407 of CMY→L*a*b* to the chart data B (CMY) 704. Whether or not differences between the L*a*b* values and the L*a*b* data 702 lie within a predetermined threshold value is discriminated. If they lie within the threshold value, it is determined that the data lies in the color gamut. If they are out of the threshold value, it is determined that the data is out of the color gamut. Only the data in the color gamut is extracted and the chart data C (CMY) 706 is formed. Finally, in step S707, the controller 102 stores the chart data C (CMY) 706 as reference data 308.

As mentioned above, by limiting the type of toner which is used to CMY and using the color gamut information, the number of patch data of the chart can be reduced. By adjusting the number of L*a*b* data 702, the number of patch data can be further reduced.

Figure 9:
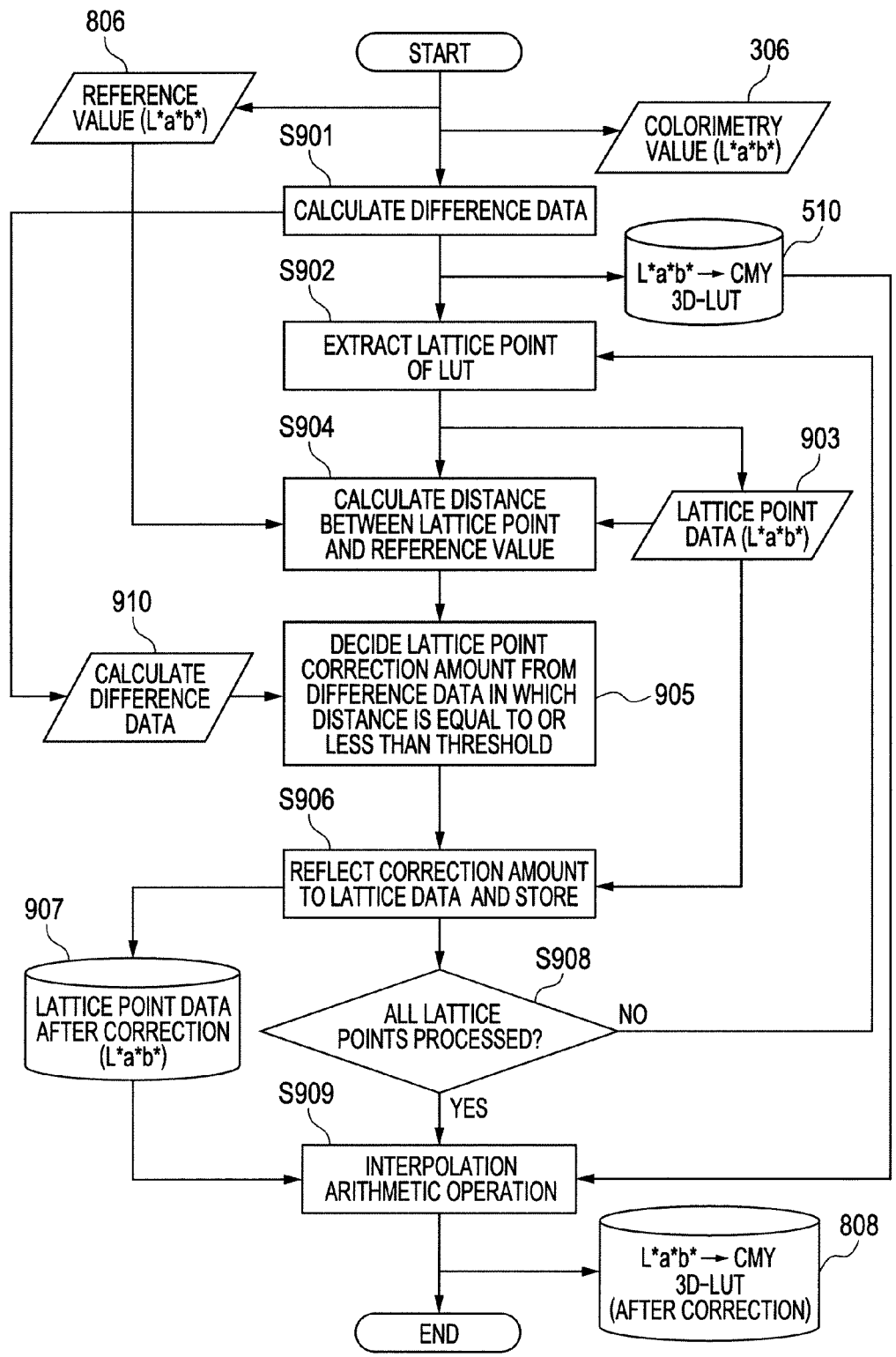
FIG. 9 is a flowchart illustrating a flow of a process to correct a 3-dimensional LUT of L*a*b*→CMY.
Figure 10:
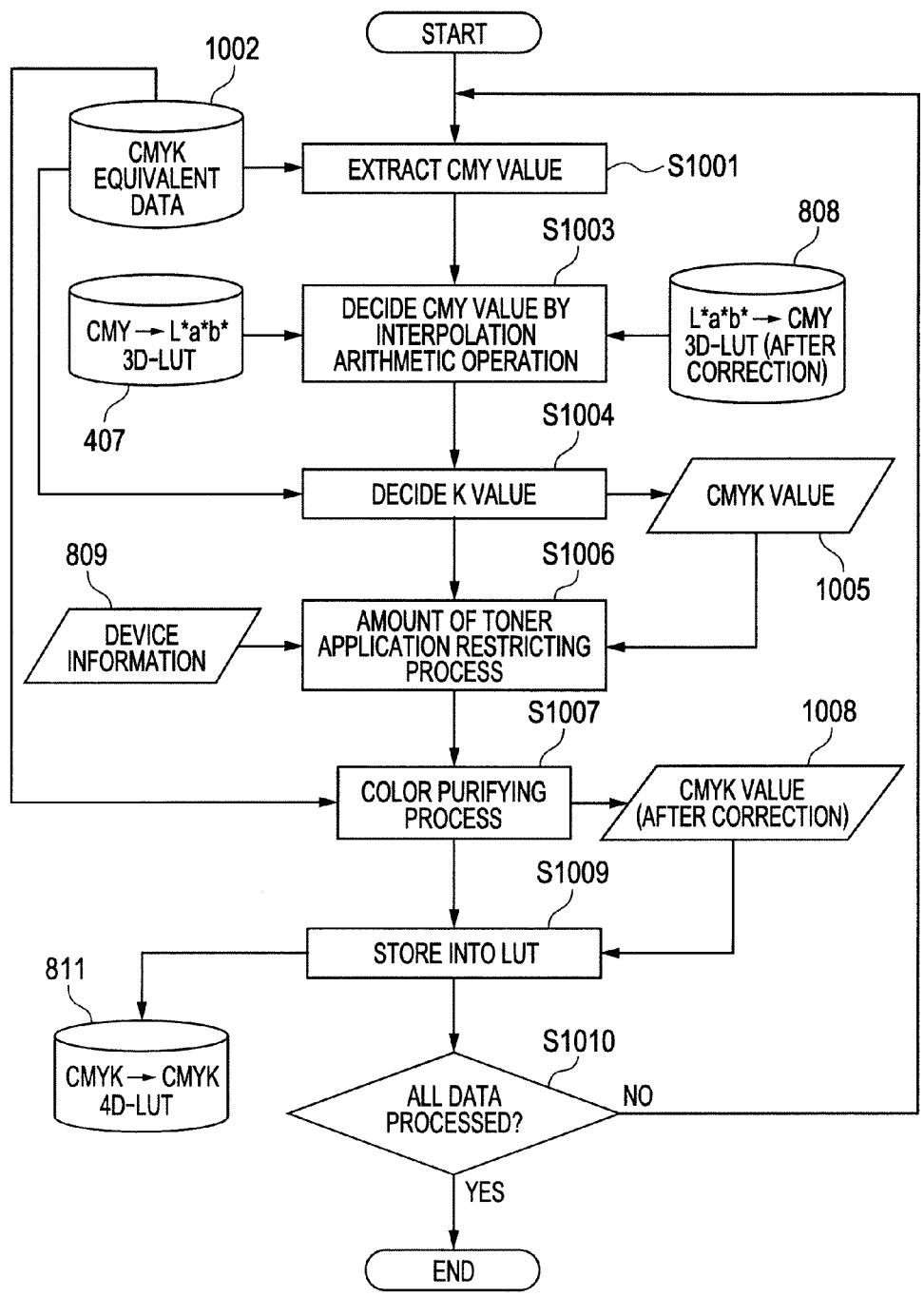
FIG. 10 is a flowchart illustrating a flow of a process to form a 4-dimensional LUT for converting CMYK into CMYK.

Subsequently, details of the color shade correction parameter creation in steps S304 to S307 will be described with reference to FIGS. 8 to 10.

Figure 8:
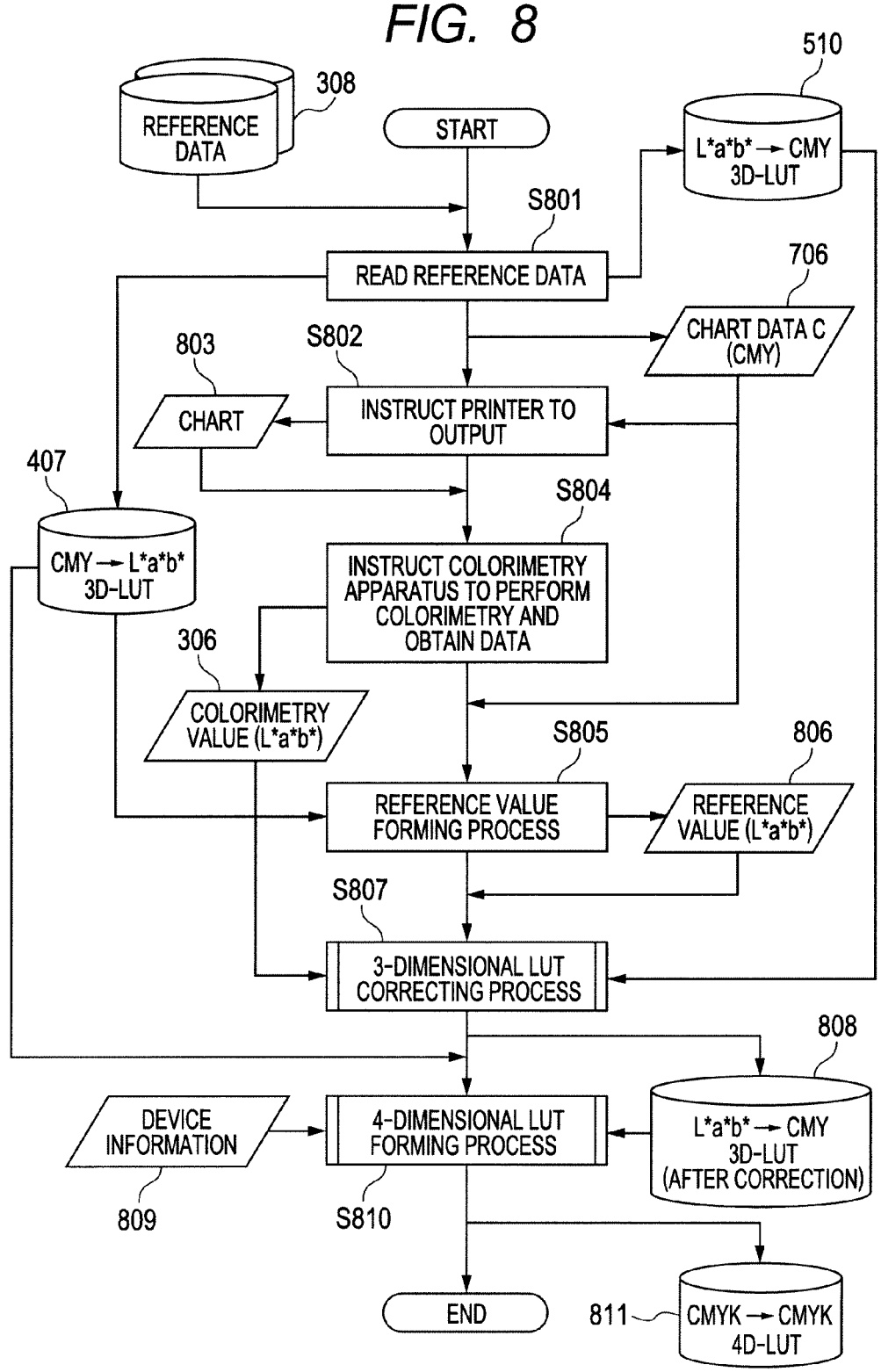
FIG. 8 is a flowchart illustrating a flow of a process to form a color shade correction parameter.

FIG. 8 illustrating a flow of the process to form the color shade correction parameter. The color shade correction parameter is a 4D-LUT for converting CMYK into CMYK. The 4D-LUT is a 4-dimensional LUT and is used in a 4D-LUT correcting process which is executed in step S212 by the image processing unit 114.

First, in step S801, the controller 102 reads out the data from the reference data 308 and obtains the 3D-LUT 407 of CMY→L*a*b*, the 3D-LUT 510 of L*a*b*→CMY, and the chart data C (CMY) 706. As reference data 308 used here, the data selected on the reference selection display screen displayed in step S303 is selected. Subsequently, in step S802, the controller 102 issues an instruction to the printer 115 so as to output the chart data C (CMY) 706. The printer 115 prints the chart data C, thereby obtaining a chart 803. In next step S804, the controller 102 instructs the colorimetry apparatus 126 to perform the colorimetry, thereby obtaining the colorimetry values (L*a*b*) 306 of the chart 803. Subsequently, in step S805, the controller 102 forms reference values (L*a*b*) 806 by executing an interpolation arithmetic operation by using the 3D-LUT 407 of CMY→L*a*b* to the CMY values of the chart data C (CMY) 706. In step S807, a 3-dimensional LUT correcting process is executed by using the reference values (L*a*b*) 806, the colorimetry values (L*a*b*) 306, and the 3D-LUT 510 of L*a*b*→CMY, thereby forming a 3D-LUT 808 of L*a*b*→CMY (after the correction). Details of the process will be described hereinafter. Finally, the controller 102 forms a 4D-LUT 811 of CMYK→CMYK by using the 3D-LUT 407 of CMY→L*a*b*, the 3D-LUT 808 of L*a*b*→CMY (after the correction), and device information 809. A forming process of the 4-dimensional LUT will be also described hereinafter. Although the reference values (L*a*b*) 806 are formed by the interpolation arithmetic operation in the embodiment, an arbitrary forming method may be used. For example, the colorimetry values (L*a*b*) 306 obtained from the chart data which was output from the printer 115 at arbitrary timing may be used as reference values (L*a*b*) 806.

Subsequently, details of the 3-dimensional LUT correcting process shown in step S807 will be described with reference to FIG. 9. First, in step S901, the controller 102 calculates difference data 910 by using the colorimetry values (L*a*b*) 306 and the reference values (L*a*b*) 806. The difference data 910 of the number as many as the number of data in the chart data C (CMY) 706 are calculated. Subsequently, in step S902, the controller 102 extracts one of the lattice point data (L*a*b*) in the LUT 510 of L*a*b*→CMY. This data becomes lattice point data (L*a*b*) 903. The data of L*a*b* becomes data in which the lattice point exists each time L* increases every about three values and each of and b* increase equivalently every four values on the assumption that L* lies within a range from 0 to 100, each of a* and b* within a range from −128 to 128, and the number of lattice points is equal to 33×33×33. That is, the lattice point data extracted here is one of the 35937 (=33×33×33) data constructed in a range from (L*a*b*)=(0, −128, −128) to (L*a*b*)=(100, 128, 128).

Subsequently, in step S904, the controller 102 calculates a distance between the lattice point data (L*a*b*) 903 and the reference values (L*a*b*) 806. In step S905, the controller 102 extracts the difference data in which the distance is equal to or less than a predetermined threshold value and determines a correction amount of the lattice point data (L*a*b*) 903 from the difference data. There is a possibility that a plurality of extracted difference data exist. Among them, the data in which the distance is close to the lattice point data (L*a*b*) 903 and the data in which the distance is far from the lattice point data (L*a*b*) 903 exist. In order to enhance an influence of the difference data in which the distance is close and to weaken an influence of the difference data in which the distance is far, a weight addition is performed to the difference data by using the calculated distance, thereby deciding the lattice point correction amount. The correction amount in the case where the difference data does not exist in the predetermined threshold value is equal to 0.

Subsequently, in step S906, the controller 102 reflects the lattice point correction amount to the lattice point data (L*a*b*) and stores the resultant data as lattice point data (L*a*b*) 907 after the correction. In step S908, the controller 102 discriminates whether or not the process has been executed to all lattice point data. If the process is not executed to all of the lattice point data, new lattice point data is extracted in step S902 and the process is repeated. If all of the lattice points have been processed, in step S909, the controller 102 executes an interpolation arithmetic operation process. If all of the lattice point data have been processed, the lattice point data (L*a*b*) 907 after the correction of the number as many as the number of lattice points are formed. In step S909, the interpolation arithmetic operation is executed to the lattice point data (L*a*b*) by using the LUT 510 of L*a*b*→CMY and new CMY values are calculated. Those CMY values are stored as output values to the inherent (L*a*b* which are extracted in step S902) lattice point data and the 3D-LUT 808 of L*a*b*→CMY (after the correction) is formed.

As mentioned above, by determining the correction amount of the lattice point with reference to the difference data existing within a predetermined distance from the lattice point, the correction amount of many lattice point data can be decided by the small number of data. The invention is not limited to the example of the embodiment but an arbitrary method may be used so long as it is a method of correcting the 3D-LUT 510 of L*a*b*→CMY.

Subsequently, a 4-dimensional LUT forming process in step S810 will be described with reference to FIG. 10.

First, in step S1001, the controller 102 extracts the CMY values from CMYK equivalent data 1002. The number of CMYK equivalent data is equal to the number of lattice points of the 4D-LUT 811 of CMYK→CMYK and an interval between the data is also the same. For example, if the number of lattice points of the 4D-LUT 811 of CMYK→CMYK is equal to 4096 (=8×8×8×8), the number of CMYK equivalent data 1002 is equal to 4096. When the data is expressed by 8 bits (0 to 255), the interval between the data is equal to about 36.

Subsequently, in step S1003, the controller 102 executes the interpolation arithmetic operation by using the 3D-LUT 407 of CMY→L*a*b* and the 3D-LUT 808 of L*a*b*→CMY (after the correction) and decides the CMY values. First, the interpolation arithmetic operation is executed from the extracted CMY values by using the 3D-LUT 407 of CMY→L*a*b*. Subsequently, the interpolation arithmetic operation is executed from the calculated L*a*b* values by using the 3D-LUT 808 of L*a*b*→CMY (after the correction) and the CMY values are calculated.

Subsequently, in step S1004, the controller 102 extracts a value of K of the CMYK equivalent data 1002 and forms CMYK values 1005 by combining the decided CMY values. The K value extracted here corresponds to the CMY values extracted in step S1001. In step S1006, the controller 102 executes an amount of toner application restricting process by using the device information 809. The device information 809 mentioned here denotes information in which a toner amount to which the printer 115 can be applied is expressed by a numerical value and is defined as "amount of toner application" in the embodiment. For example, in the case of CMYK, if the maximum value of a monochrome is assumed to be 100%, a signal value of 400% can be set at most. However, the amount of toner application in the case where the total number of toner which can be applied is equal to 300% is equal to 300%. Since there is a possibility that the CMYK values 1005 exceed the specific amount of toner application in dependence on their combination, the amount of toner application restricting process is executed by executing an existing UCR process or the like. The UCR process is a process for replacing the toner of CMY by the toner of K. Generally, in the case of expressing black, a method of expressing black by using the toner of an equal amount with respect to CMY and a method of expressing black solely by K exist. In the case of expressing black solely by K, although a density is smaller than that in the case of expressing black by CMY, there is such an advantage that the amount of toner application can be reduced.

In step S1007, the controller 102 executes a color purifying process and forms CMYK values (after the correction) 1008. When correcting by the 4D-LUT 811 of CMYK→CMYK, for example, it is ideal that the data of a cyan monochrome is output by the cyan monochrome. To realize it, in the case of pure color data, the CMYK values are corrected to the pure color data with reference to the CMYK equivalent data 1002 serving as original data. For example, in the case where although the CMYK equivalent data 1002 is the data of the cyan monochrome, a value of magenta is included in the CMYK values (after the correction) 1008, the value of magenta is set to 0. In step S1009, the controller 102 stores the CMYK values (after the correction) 1008 into the 4D-LUT 811 of CMYK→CMYK. Finally, in step S1010, the controller 102 discriminates whether or not all of the CMYK equivalent data 1002 have been processed. If all of the CMYK equivalent data 1002 are not processed, the CMY values are extracted from the remaining CMYK equivalent data 1002 and the process is repeated. If all of the CMYK equivalent data 1002 have been processed, the processing routine is finished and the 4D-LUT 811 of CMYK→CMYK is completed.

Although the number of lattice points of the LUT has been mentioned in the embodiment, the invention is not limited to such a value but it may be an arbitrary number. Further, an LUT of a special construction such as an LUT in which the number of lattice points of C in the 4D-LUT 811 of CMYK→CMYK and that of M differ may be used.

According to the embodiment, the parameter for correcting the color shade of the color mixture at high precision can be formed irrespective of the number and type of profiles which are used and the color converting method. The correction data which is used in the multi-dimensional LUT can be formed by the small number of data of the chart.

Embodiment 2

Subsequently, an embodiment in the case of correcting existing profile information such as an ICC profile or the like will be described. The embodiment 1 has been described with respect to the 4D-LUT forming process in a state where the 4D-LUT correcting process of step S212 can be executed in the image processing unit 114. An embodiment 2 will be described with respect to an example in the case where the 4D-LUT correcting process of S212 cannot be executed in the image processing unit 114.

When the 4D-LUT correcting process of S212 cannot be executed in the image processing unit 114, the 4D-LUT for correction is formed and, thereafter, it is stored into the storing device 121 in the controller 102 or a memory (not shown). Subsequently, if the correcting process is executed by the stored 4D-LUT to the CMYK values to be output such as destination profile 108, device link profile 110, or the like, the corrected profile can be formed.

Figure 11:
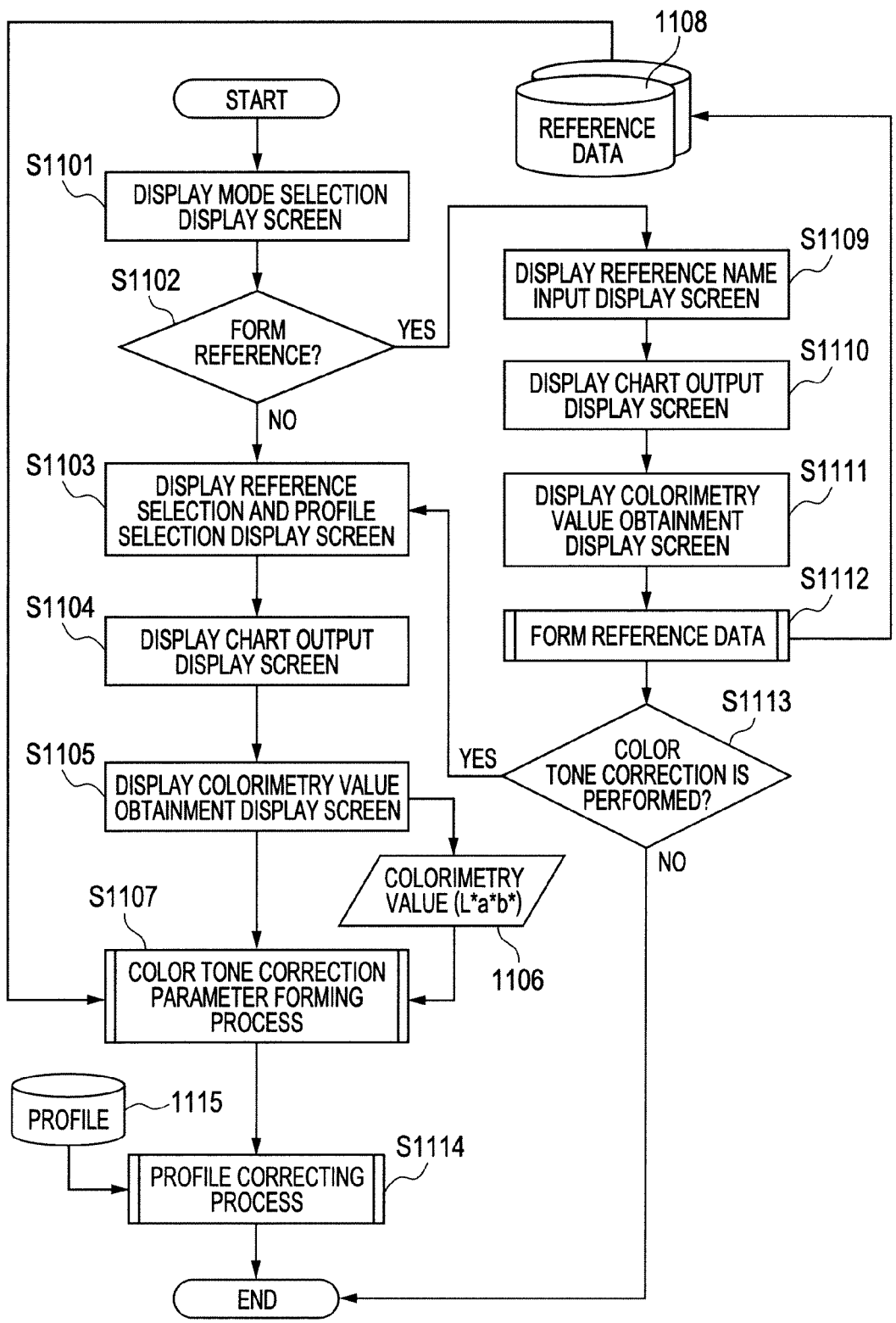
FIG. 11 is a flowchart illustrating a flow of a UI for promoting the user to instruct to form a 4-dimensional LUT and a corrected profile.

FIG. 11 is a flowchart illustrating a flow of a UI for promoting the user to instruct to form the 4-D LUT and the corrected profile. Among processes in steps S1101 to S1114, the processes other than steps S1103 and S1114 are similar to the corresponding processes in steps S301 to S307 in FIG. 3, their description is omitted.

Figure 18:
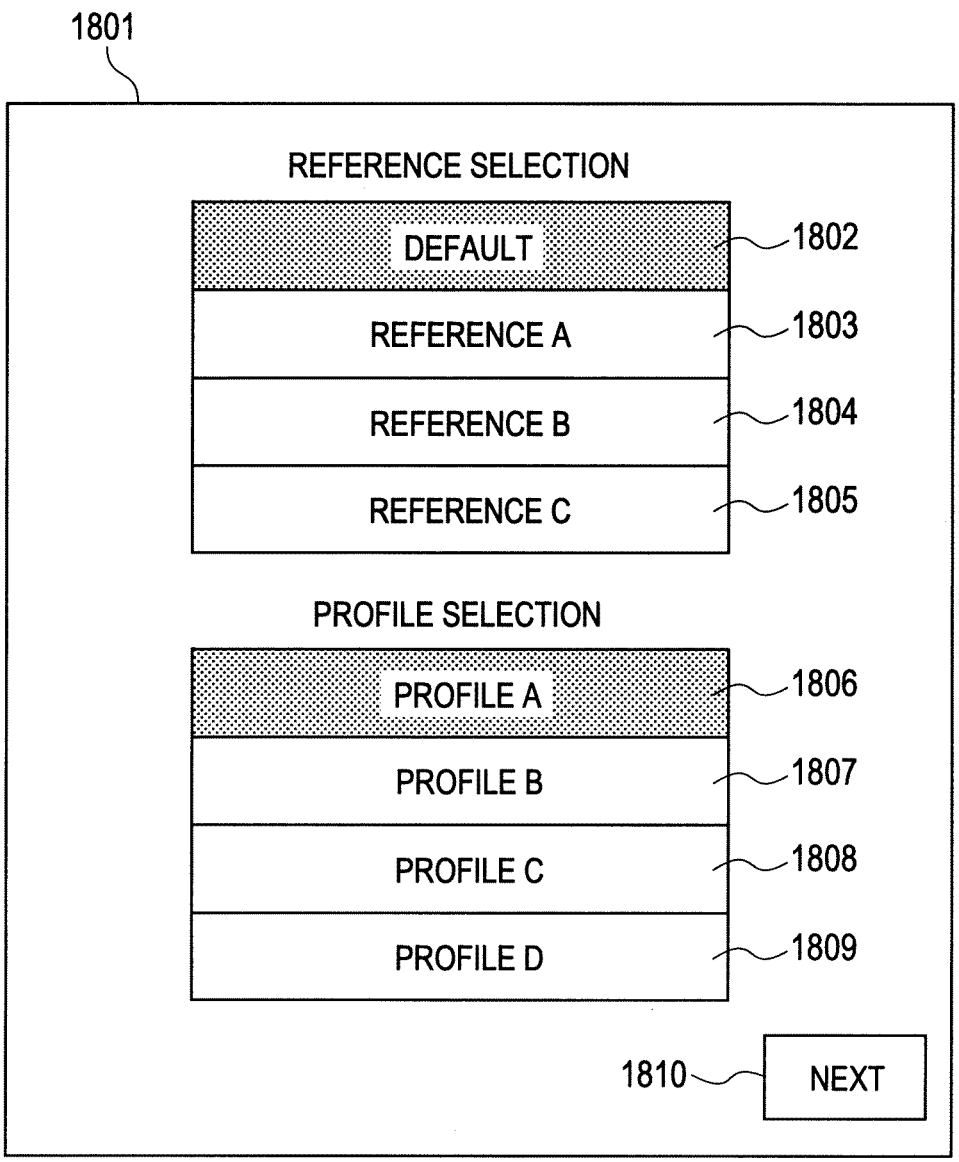
FIG. 18 is a diagram illustrating an example of a reference selection and profile selection display screen.

If the reference is not formed in step S1102 or if the color shade is corrected in step S1113, the display apparatus 118 displays a reference selection and profile selection display screen. An example of the reference selection and profile selection display screen is illustrated in FIG. 18. The display apparatus 118 displays candidates of the reference and candidates of the profile serving as a correction target into a UI 1801 by a list form. Since 1802 to 1805 in the reference selection display screen are similar to 1602 to 1605 in FIG. 16, their description is omitted. In the embodiment, besides the reference, the profile serving as a correction target is also selected. A profile A 1806, a profile B 1807, a profile C 1808, and a profile D 1809 are displayed in a list different from the list of the references and correspond to the profiles such as destination profile 108 and the like. The profile serving as a correction target is selected by an instruction of the user. When a "next" button 1810 is pressed after the reference and the profile were selected on the list, the reference data and the profile are selected and the next display screen is displayed.

After the color correcting process was executed in step S1107, in step S1114, the controller 102 reads out a profile 1115 and executes the profile correcting process. The profile 1115 is a profile selected in step S1103.

Figure 12:
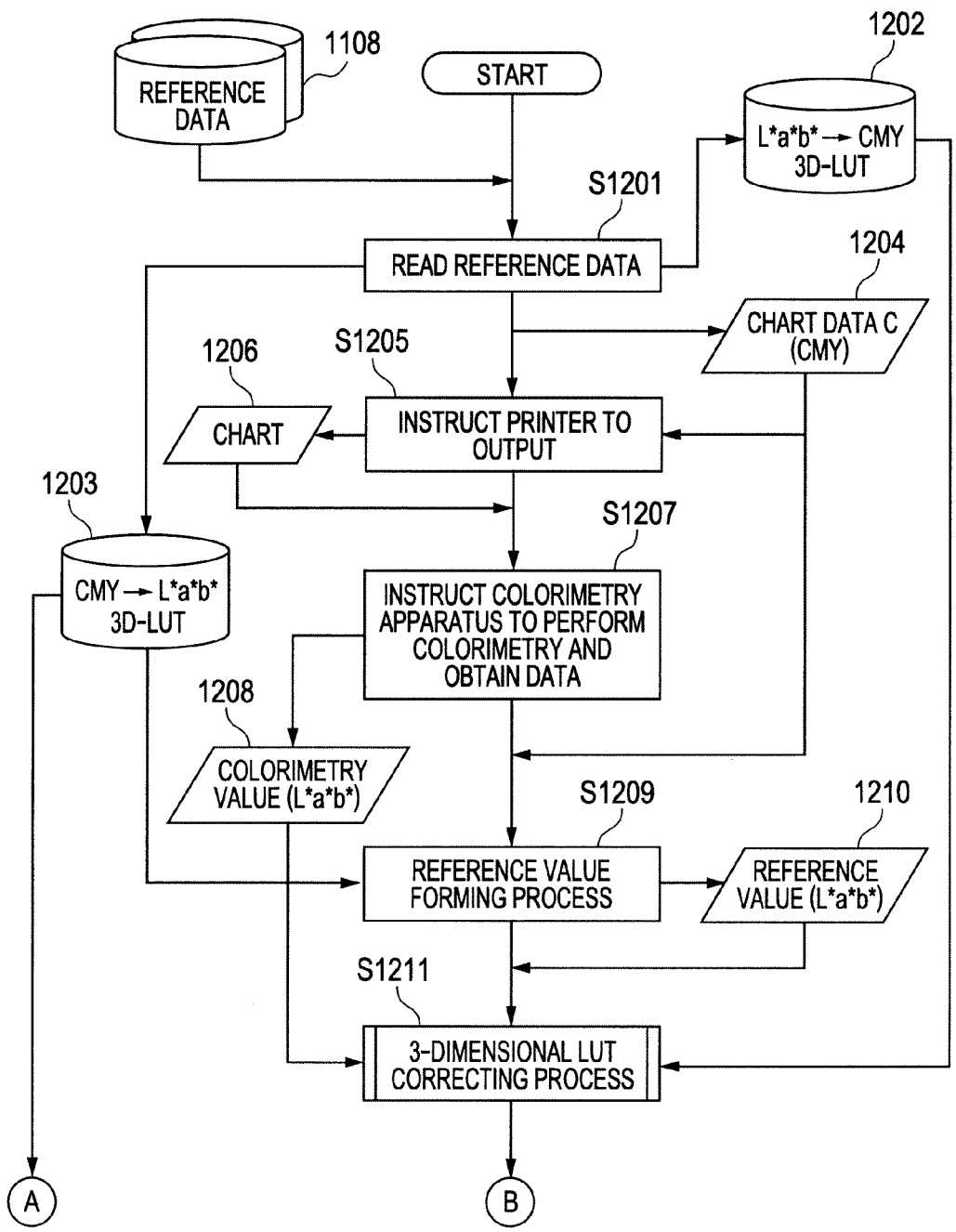
FIG. 12 is comprised of FIGS. 12A and 12B showing flowchart illustrating a flow of a color shade correction parameter creation and a profile correcting process.
Figure 12B:
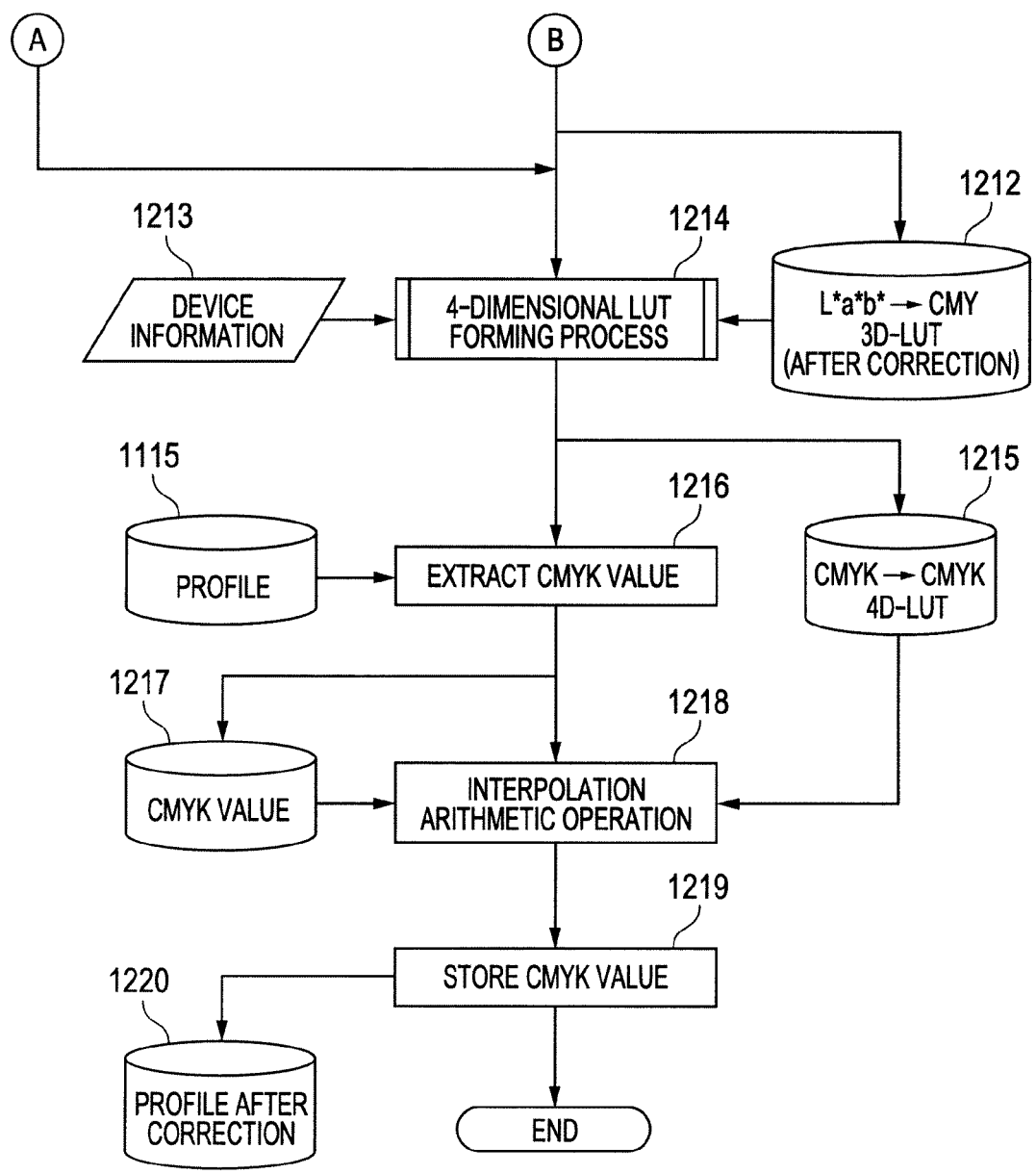

FIGS. 12A and 12B are flowcharts illustrating a flow of a color shade correction parameter creation in steps S1104 to S1107 and a profile correcting process in step S1114. Steps S1201 to S1214 correspond to the color shade correction parameter forming process S1107 and are similar to the processes of steps S801 to S810 in FIG. 8, their description is omitted. Steps S1216 to S1218 correspond to the profile correcting process in S1114.

After a 4D-LUT 1215 of CMYK→CMYK for correcting the color mixture was formed in step S1214, the controller 102 extracts CMYK values 1217 as output values of lattice points of the profile 1115 in step S1216. For example, in the case of the destination profile 108 for converting L*a*b* into CMYK, all of the CMYK values corresponding to the number of lattice points of L*a*b* are extracted. When the number of lattice points is equal to 33×33×33, the number of CMYK values 1217 is equal to 35937 (=33×33×33). Subsequently, in step S1218, the controller 102 forms the CMYK values corrected by executing an interpolation arithmetic operation by using the 4D-LUT 1215 of CMYK→CMYK. Finally, in step S1219, the controller 102 stores the corrected CMYK values as CMYK values corresponding to the lattice points of the profile 1115, thereby forming a profile 1220 after the correction.

In the embodiment, as a profile 1115 serving as a correction target, an arbitrary profile may be used so long as it is data to output the values in the device dependent color space. For example, any one of the destination profile 108 and the device link profile 110 may be used. When the common RGB image 205 is converted into the CMYK image 211 in step S210 in FIG. 2, a method of converting by using the 3D-LUT or the like is considered. However, it may be applied to the CMYK values of the 3D-LUT.

According to the embodiment, the parameter for correcting the color shade of the color mixture at high precision can be formed irrespective of the number and type of profiles which are used and the color converting method. The correction data which is used in the multi-dimensional LUT can be formed by the small number of data of the chart. Further, according to the embodiment, by directly correcting the data which outputs the CMYK values such as a profile or the like, even if a circuit for correcting the 4-dimensional LUT does not exist, the color shade of the color mixture can be corrected.

Embodiment 3

Subsequently, an embodiment in the case where information of the profile is used when the chart data as one of the reference data is decided will be described. Although the color gamut in/out discrimination has been made when the chart data is decided in the embodiment 1, in an embodiment 3, by further selecting the data of the chart by using a profile 1313, the number of patch data of the chart can be decreased while maintaining the precision. In the embodiment 1, the data of the chart is selected by using information of a color gamut. However, since the number of profiles which are actually selected by the user is limited, there is a limitation in combinations of the CMY having a possibility that they are used. However, in the embodiment 1, when the data of the chart is formed, since it is unknown that the combination of the CMY values of the data is a combination which is actually used in the profile, there is a possibility that the correction is executed mainly with respect to the color which is not used. In the embodiment 3, by obtaining information of the combination of the CMY which are used in the profile, such an advantage of raising an efficiency that the number of patch data is reduced or the like can be attained.

Figure 13:
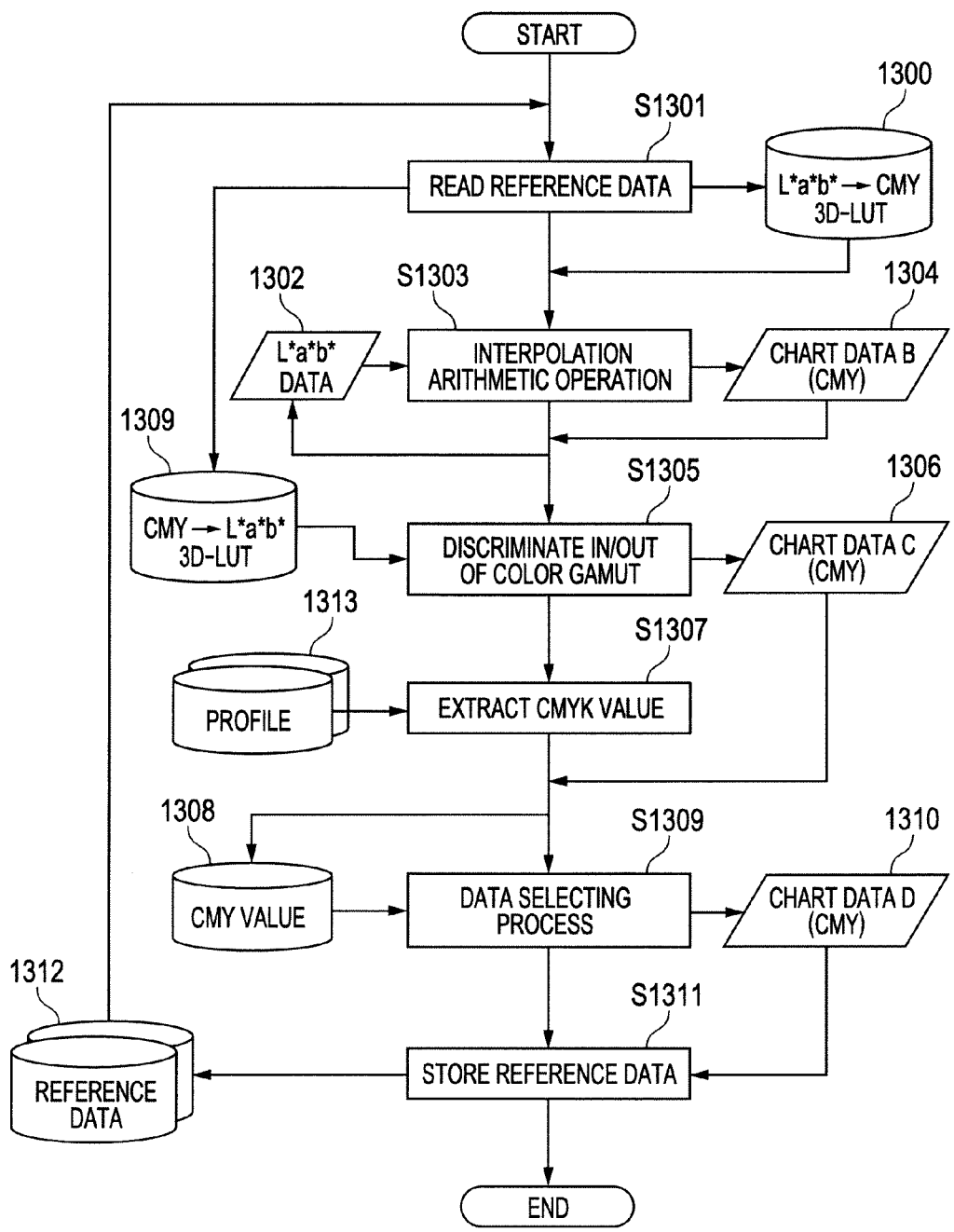
FIG. 13 is a flowchart illustrating a flow of a process to form chart data as one of the reference data by using information of the profile.

FIG. 13 is a flowchart illustrating a flow of a process to form the chart data as one of the reference data. Since processes in steps S1301 to S1305 are similar to the processes in steps S701 to S705 in FIG. 7, their description is omitted.

In step S1307, the controller 102 extracts CMY values 1308 of the profile 1313 in a manner similar to step S1216 in FIGS. 12A and 12B. The profile 1313 is a profile having a possibility that it is used by the user. In FIG. 1, if there is a possibility that the user selects both of the destination profile 108 and the device link profile 110, both of them are selected and the CMY values 1308 are extracted. Subsequently, in step S1309, the controller 102 compares chart data C (CMY) 1306 with the CMY values 1308 and executes a data selecting process. In the selecting process, numerical values of the chart data C (CMY) 1306 are extracted and differences from the CMY values 1308 are calculated and data in which the minimum difference is equal to or less than a predetermined threshold value is selected, thereby outputting chart data D (CMY) 1310. Finally, in step S1311, the chart data D (CMY) 1310 is stored as reference data 1312.

Since a flow of a process for forming the color shade correction parameter and the like are similar to those in the embodiment 1, their description is omitted.

According to the embodiment, the parameter for correcting the color shade of the color mixture at high precision can be formed irrespective of the number and type of profiles which are used and the color converting method. The correction data which is used in the multi-dimensional LUT can be formed by the small number of data of the chart. Further, according to the embodiment, by comparing with the CMY values of the profile having a possibility that they are used by the user, the number of patch data of the chart can be reduced and the color shade of the color mixture can be corrected more efficiently.

Embodiment 4

Subsequently, an embodiment in the case where the information of the profile is used when a 3D-LUT 1414 of L*a*b*→CMY as one of the reference data is formed will be described. In the embodiment 1, there is a possibility that there is a large difference between the combination of the CMY in the 3D-LUT of L*a*b*→CMY and the combination of the CMY which are used in the profile which is used by the user. In an embodiment 4, a process in which when the 3D-LUT of L*a*b*→CMY is formed, by referring to the information of the profile which is used by the user, the correction of a high precision can be made will be described.

First, in step S1401, the controller 102 extracts CMYK values 1403 from a profile 1402 which is used by the user. As a profile, an arbitrary profile having a possibility that it is used by the user may be used. Subsequently, in step S1404, the controller 102 decides CMY values of vertices of the RGB lattice points by using the CMYK values 1403. In the embodiment 1, in the case of RGBCMY, a combination of the CMY in which the saturation is largest is selected, and in the case of Bk, a combination in which the brightness is smallest is selected. In the embodiment 4, in the case of RGBCMY, a combination in which the differences from the CMYK values 1403 are small among the combinations in which the saturation is large is selected and decided, and in the case of Bk, a combination in which the differences from the CMYK values 1403 are small among the combinations in which the brightness is small is selected and determined.

Since a flow of processes in steps S1406 to S1413 is similar to a flow of the processes in steps S502 to S509 in FIG. 5, their description is omitted.

Subsequently, in step S1415, the controller 102 compares the 3D-LUT 1414 of L*a*b*→CMY with the value of the profile 1402 and calculates a minimum value of the differences. In step S1416, the controller 102 discriminates whether or not the minimum value of the differences calculated by the comparison is equal to or less than a threshold value. If it is equal to or less than the threshold value, it is determined that the combination of the 3D-LUT 1414 of L*a*b*→CMY and the CMY of the profile is close. In step S1417, the controller 102 stores the 3D-LUT 1414 of L*a*b*→CMY as reference data 1418.

Figure 14:
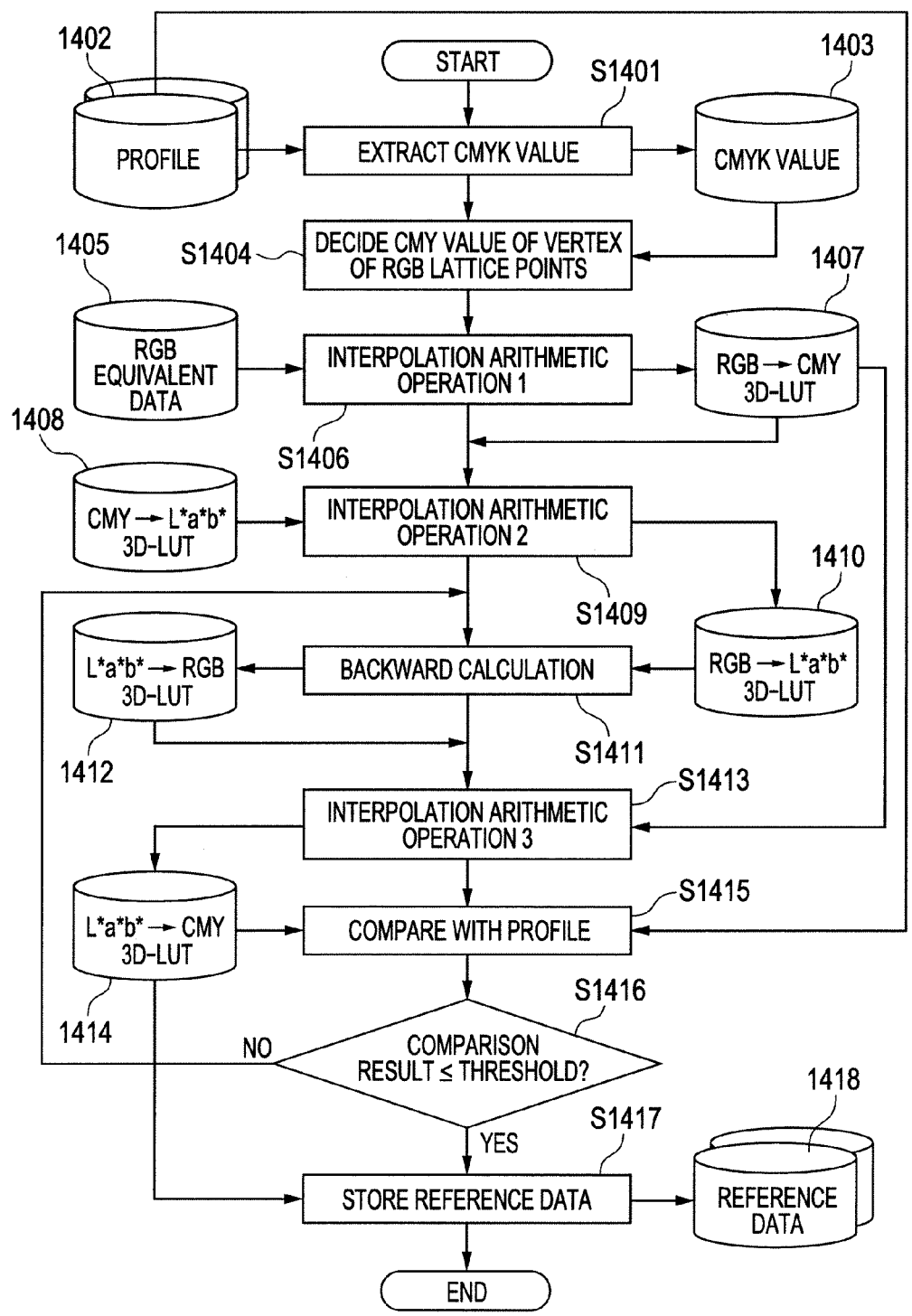
FIG. 14 is a flowchart illustrating a flow of a process to form an LUT for converting L*a*b* as one of the reference data into CMY by using the information of the profile.

If the minimum value of the differences is larger than the threshold value in step S1416, the controller 102 repeats a backward calculation of step S1411 again. Since the same result is obtained by executing the similar backward calculation here, by changing the method or adjusting a target at the time of the backward calculation, a 3D-LUT 1412 of L*a*b*→RGB different from that in the foregoing process is obtained. In the example of FIG. 14, the process is repeated until the comparison result is equal to or less than the threshold value in step S1416. However, it is also possible to construct in such a manner that the number of repetition times of the processes of steps S1411 to S1415 is counted and after the processes were repeated a predetermined number of times or more, even if the number of repetition times is larger than the threshold value, processes in step S1417 and subsequent steps are executed.

Since a flow of the process for forming the color shade correction parameter and the like are similar to those in the foregoing embodiment, their description is omitted.

According to the embodiment, the parameter for correcting the color shade of the color mixture at high precision can be formed irrespective of the number and type of profiles which are used and the color converting method. The correction data which is used in the multi-dimensional LUT can be formed by the small number of data of the chart. Further, according to the embodiment, since the reference data which is used in the correction of the color mixture becomes data which is formed in consideration of the information of the profile that is used by the user, the precision of the correction can be further improved.

In the foregoing embodiments 1 to 4, the parameter for correcting the color shade of the color mixture at high precision can be formed irrespective of the number and type of profiles which are used and the color converting method. The 4D-LUT for correction can be formed by the small number of data of the chart.

Other Embodiments

The invention is also realized by executing the following processes. That is, software (program) for realizing the functions of the embodiments mentioned above is supplied to a system or an apparatus through a network or various kinds of storage media and a computer (or a CPU, MPU, or the like) of the system or apparatus reads out the program and executes processes based on the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-127538, filed Jun. 3, 2010, which is hereby incorporated by reference herein in its entirety.

What is claimed is:

1. An image processing apparatus comprising:
an output control unit configured to allow a printer to output chart data of a plurality of kinds of color mixture expressed by a three-dimensional color space constructed by cyan, magenta, and yellow (CMY);
an obtaining unit configured to obtain colorimetry values obtained from the output chart data;
a value forming unit configured to form a reference value by converting patch data of the color mixture expressed by the three-dimensional color space into a device independent color space on the basis of a first color conversion table for converting the three-dimensional color space into the device independent color space;
a data correction unit configured to calculate differences between the colorimetry values obtained by the obtaining unit and the reference value formed by the value forming unit, to extract, from the calculated differences, a difference whose distance to each lattice point data of the device independent color space in a second color conversion table for converting the device independent color space into the three-dimensional color space stays within a threshold, and to correct the lattice point data on the basis of the extracted difference;

a table correction unit configured to correct the second color conversion table by calculating values of the three-dimensional color space by using the lattice point data corrected by the data correction unit; and a table forming unit configured to form a color conversion table for correcting a four-dimensional color space constructed by cyan, magenta, yellow, and black (CMYK) by using the first color conversion table and the second color conversion table.

2. An apparatus according to claim 1, wherein the device independent color space is L*a*b*.

3. An apparatus according to claim 1, wherein the table forming unit includes a unit configured to correct it by using information regarding a toner amount to which the printer can be applied.

4. An apparatus according to claim 1, wherein the table forming unit maintains a state of a pure color in the case where CMYK values indicate the pure color.

5. An apparatus according to claim 1, wherein the chart data of the color mixture is formed by using the second color conversion table.

6. An apparatus according to claim 1, wherein the chart data of the color mixture is formed by discriminating whether or not it lies within a color gamut of the printer.

7. An apparatus according to claim 1, wherein the first color conversion table is formed by using chart data different from the chart data of the color mixture.

8. An apparatus according to claim 1, wherein the second color conversion table is calculated by using the first color conversion table.

9. An apparatus according to claim 1, wherein the second color conversion table is calculated by deciding CMY values of vertices of lattice points of an RGB color space and executing an interpolation arithmetic operation on the basis of the decided CMY values.

10. An apparatus according to claim 1, wherein the table forming unit extracts device dependent CMYK values described in an ICC profile and corrects the extracted values by using the color conversion table for correcting the four-dimensional color space, thereby calculating the corrected profile.

11. An apparatus according to claim 1, wherein the chart data of the color mixture is formed by using CMY values of a profile.

12. An apparatus according to claim 1, wherein the second color conversion table is calculated by deciding CMY values of vertices of lattice points of an RGB color space by using CMY values obtained from a profile and executing an interpolation arithmetic operation on the basis of the decided CMY values.

13. An image processing method comprising:
allowing a printer to output chart data of a plurality of kinds of color mixture expressed by a three-dimensional color space constructed by cyan, magenta, and yellow (CMY);
obtaining colorimetry values obtained from the output chart data;
forming a reference value by converting patch data of the color mixture expressed by the three-dimensional color space into a device independent color space on the basis of a first color conversion table for converting the three-dimensional color space into the device independent color space;
calculating differences between the obtained colorimetry values and the formed reference value;
extracting, from the calculated differences, a difference whose distance to each lattice point data of the device independent color space in a second color conversion table for converting the device independent color space into the three-dimensional color space stays within a threshold;
correcting the lattice point data on the basis of the extracted difference;
correcting the second color conversion table by calculating values of the three-dimensional color space by using the corrected lattice point data; and
forming a color conversion table for correcting a four-dimensional color space constructed by cyan, magenta, yellow, and black (CMYK) by using the first color conversion table and the second color conversion table.

14. A non-transitory computer-readable storage medium storing a computer-executable program for causing a computer to execute the image processing method according to claim 13.

15. An apparatus according to claim 14, wherein the reference value is formed by converting patch data of the color mixture expressed by the three-dimensional color space into the device independent color space on the basis of the first color conversion table for converting the three-dimensional color space into the device independent color space.

16. An apparatus according to claim 14, wherein the reference value is formed from the colorimetry values obtained from the chart data output at arbitrary timing.

17. An image processing apparatus comprising:
an output control unit configured to allow a printer to output chart data of a plurality of kinds of color mixture expressed by a three-dimensional color space constructed by cyan, magenta, and yellow (CMY);
a first obtaining unit configured to obtain colorimetry values which are obtained from the output chart data;
a second obtaining unit configured to obtain a first color conversion table for converting a three-dimensional color space into a device independent color space;
a third obtaining unit configured to obtain a reference value of the device independent color space which has previously been formed;
a data correction unit configured to calculate differences between the colorimetry values obtained by the first obtaining unit and the reference value obtained by the third obtaining unit, to extract, from the calculated differences, a difference whose distance to each lattice point data of the device independent color space in a second color conversion table for converting the device independent color space into the three-dimensional color space stays within a threshold, and to correct the lattice point data on the basis of the extracted difference;
a table correction unit configured to correct the second color conversion table by calculating values of the three-dimensional color space by using the lattice point data corrected by the data correction unit; and
a forming unit configured to form a color conversion table for correcting a four-dimensional color space constructed by cyan, magenta, yellow, and black (CMYK) by using the first color conversion table and the second color conversion table.

18. An image processing method comprising:
allowing a printer to output chart data of a plurality of kinds of color mixture expressed by a three-dimensional color space constructed by cyan, magenta, and yellow (CMY);
obtaining colorimetry values which are obtained from the output chart data;
obtaining a first color conversion table for converting a three-dimensional color space into a device independent color space;

obtaining a reference value of the device independent color space which has previously been formed;

calculating differences between the obtained colorimetry values and the obtained reference value;

extracting, from the calculated differences, a difference whose distance to each lattice point data of the device independent color space in a second color conversion table for converting the device independent color space into the three-dimensional color space stays within a threshold;

correcting the lattice point data on the basis of the extracted difference;

correcting the second color conversion table by calculating values of the three-dimensional color space by using the corrected lattice point data; and forming a color conversion table for correcting a four-dimensional color space constructed by cyan, magenta, yellow, and black (CMYK) by using the first color conversion table and the second color conversion table.

19. A non-transitory computer-readable storage medium storing a computer-executable program for causing a computer to execute the image processing method according to claim 18.

* * * * *